US006748098B1

(12) United States Patent  
Rosenfeld

(10) Patent No.: US 6,748,098 B1
(45) Date of Patent: Jun. 8, 2004

(54) ALGEBRAIC RECONSTRUCTION OF IMAGES FROM NON-EQUIDISTANT DATA

(75) Inventor: Daniel Rosenfeld, Haifa (IL)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 09/445,833

(22) PCT Filed: Apr. 14, 1999

(86) PCT No.: PCT/IL99/00199

§ 371 (c)(1),
(2), (4) Date: Dec. 13, 1999

(87) PCT Pub. No.: WO99/53440

PCT Pub. Date: Oct. 21, 1999

Related U.S. Application Data

(60) Provisional application No. 60/081,642, filed on Apr. 14, 1998.

(51) Int. Cl.$^7$ ................................................ G06K 9/00
(52) U.S. Cl. ........................................ 382/131; 600/410
(58) Field of Search ................................ 382/133, 128, 382/131; 324/309; 600/410; 128/922

(56) References Cited

U.S. PATENT DOCUMENTS

| 5,483,567 | A | * | 1/1996 | Swerdloff | ........................ | 378/4 |
| 5,524,130 | A | | 6/1996 | Ohhashi | ........................ | 378/15 |
| 5,720,708 | A | * | 2/1998 | Lu et al. | ........................ | 600/447 |
| 6,043,652 | A | * | 3/2000 | Liu | ........................ | 324/309 |

FOREIGN PATENT DOCUMENTS

| WO | WO 98/36690 | 8/1998 | ............ | A61B/6/03 |
| WO | WO 98/36691 | 8/1998 | ............ | A61B/6/03 |

OTHER PUBLICATIONS

Bruder et al., "Image Reconstruction of Echo Planar Imaging with Nonequidistant k–Space Sampling", Magnetic Resonance in Medicine, 1992, vol. 23, pp. 311–323.*

O'Sullivan, J.; "A Fast Sinc Function Gridding Algorithm for Fourier Inversion in Computer Tomography"; IEEE Transactions on Medical Imaging; vol. MI–4; No. 4; pps. 200–207; Dec. 1985.

Jackson, J. et al; "Selection of a Convolution Function for Fourier Inversion Using Gridding"; IEEE Transactions on Medical Imaging; vol. 10; No. 3; pps. 473–478; Sep. 1991.

Meyer, C. et al.; "Fast Spiral Coronary Artery Imaging"; Magnetic Resonance in Medicine; vol. 28; pps. 202–213; 1992.

Hoge, R. et al.; "Density Compensation Functions for Spiral MRI"; Magnetic Resonance in Medicine; vol. 38; pps. 117–128; 1997.

(List continued on next page.)

Primary Examiner—Brian Werner
Assistant Examiner—Ryan J. Miller
(74) Attorney, Agent, or Firm—Ziolkowski Patent Solutions Group, LLC; Michael A. Della Penna; Carl B. Horton

(57) ABSTRACT

A method of resampling medical imaging data from a first spatial distribution of data points onto a second spatial distribution of data points. The method includes determining a matrix of coefficients for resampling data from the second spatial distribution onto the first spatial distribution and inverting a matrix based on the matrix of coefficients to determine forward resampling coefficients for resampling data from the first spatial distribution to the second spatial distribution. Then, resampling data from the first spatial distribution onto the second spatial distribution using the forward resampling coefficients.

54 Claims, 13 Drawing Sheets

OTHER PUBLICATIONS

Parker, J. et al.; "Comparison of Interpolating Methods for Image Resampling"; IEEE Transactions on Medical Imaging vol. MI–2; No. 1; pps. 31–39; Mar. 1983.

Zakhor, A. et al.; "Optimal Sampling and Reconstruction of MRI Signals Resulting from Sinusoidal Gradients"; IEEE Transactions on Signal Processing; vol. 39; No. 9; pps. 2056–2065; Sep. 1991.

Marple, S. Jr.; "Digital spectral analysis"; Prentice Hall Inc.; pps. 75–78; 1987.

Scheffler, K. et al.; "Frequency Resolved Single–Shot MR Imaging Using Stochastic k–Space Trajectories"; Magnetic Resonance in Medicine; vol. 35; pps. 569–576; 1996.

Liao, J. et al.; "Reduction of Motion Artifacts in Cine MRI Using Variable–Density Spiral Trajectories"; Magnetic Resonance in Medicine; vol. 37; pps. 569–575; 1997.

Macovski, A. et al.; "A Novel Fast–Scanning System"; Works in Progress, 5th Annual Meeting of the Society of Magnetic Resonance in Medicine; pps. 156–157; 1986.

Ding, X. et al.; "Improvement of Spiral MRI with the Measured k–Space Trajectory"; JMRI; vol. 7; pps. 938–940; 1997.

Ehrhardt, J.; "MR Data Acquisition and Reconstruction Using Efficient Sampling Schemes"; IEEE Transactions on Medical Imaging; vol. 9; No. 3; pps. 305–309.

Pan, S. et al.; "A Computational Study of Reconstruction Algorithms for Diffraction Tomography: Interpolation Versus Filtered Backpropagation"; IEEE Transactions on Acoustics, Speech, and Signal Processing; vol. ASSP–31; No. 5; pps. 1262–1275; Oct. 1983.

Brouw, W.; "Aperture Synthesis"; Methods in Computational Physics; vol. 14, pps. 131,160–175; Academic Press; 1975.

* cited by examiner

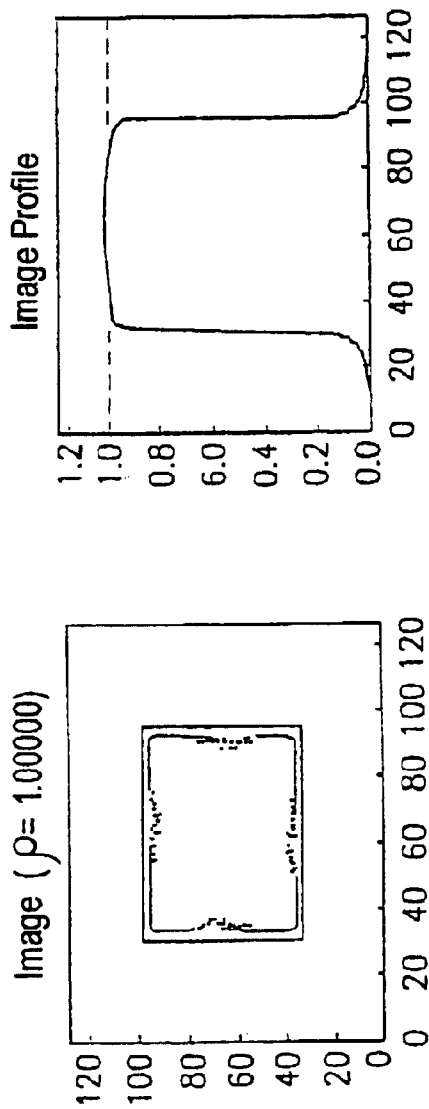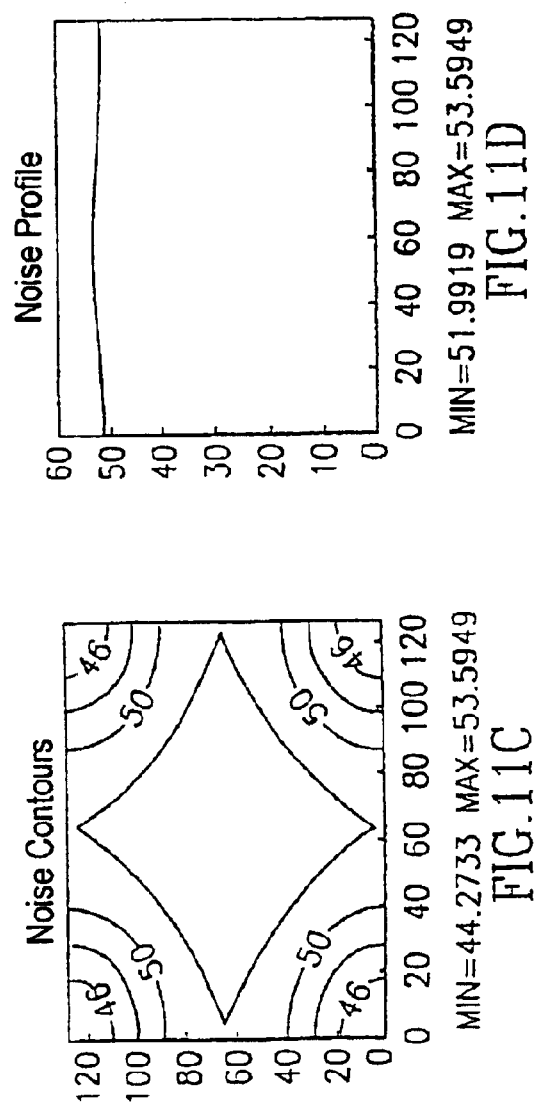
FIG.11A
FIG.11B
FIG.11C
FIG.11D

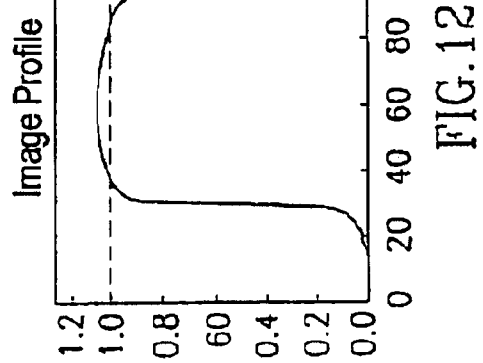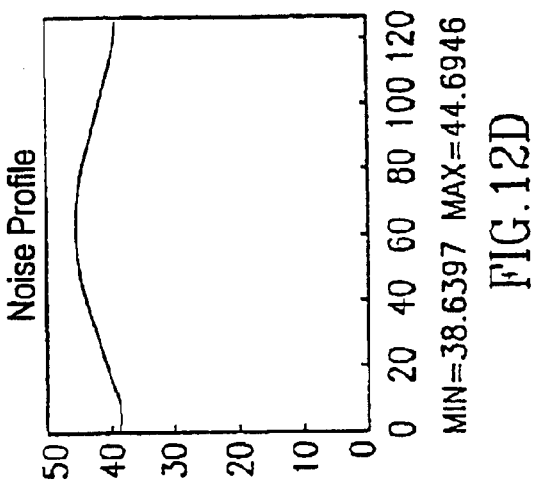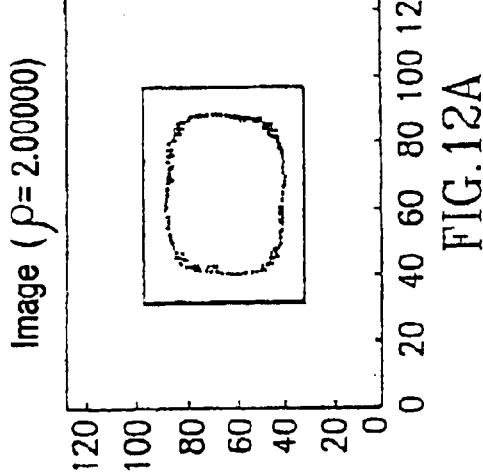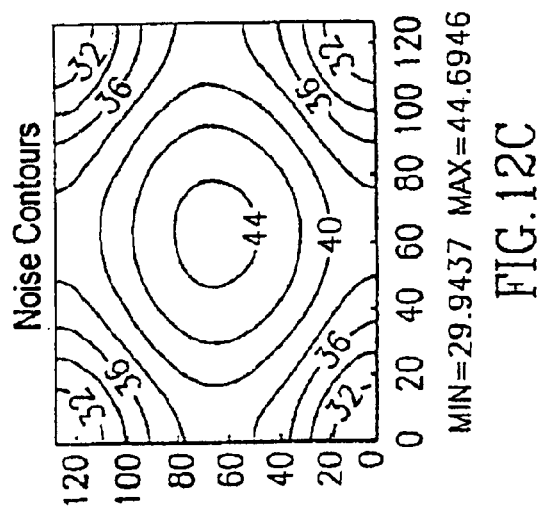

ALGEBRAIC RECONSTRUCTION OF IMAGES FROM NON-EQUIDISTANT DATA

RELATED APPLICATIONS

This application is a U.S national Stage application of PCI/IL99/00199, filed Apr. 14, 1999 and a 119(e) of U.S. provisional application No. 60/081,642, filed on Apr. 14, 1998, the disclosure of which is incorporated herein by reference.

FIELD OF THE INVENTION

The present invention relates to signal data processing and in particular to efficient resampling of non-uniformly sampled data for medical imaging.

BACKGROUND OF THE INVENTION

The Fourier Transform (FT) is one of the most important signal processing techniques in use today. In particular, it finds a number of uses in medical imaging, including reconstruction of MRI images and Fourier reconstruction of CT images. In MRI applications, the FT is used to convert the acquired data into an image. The quality and accuracy of the image is of utmost importance in medical examinations.

The Fast Fourier Transform (FFT), is an efficient implementation of the FT, which can only be utilized on data that is uniformly sampled in a transform domain. In addition to the FFT, there are other signal and image processing techniques that require the input data to be sampled to a specific grid, for example, backprojection reconstruction in CT or MRI imaging and diffraction tomography.

In many real-world situations, the data is not uniformly sampled. In spiral MRI, for example, the non-uniform sampling is due to variations in magnetic gradients and timing circuits. Typically, allowing non-uniform sampling can significantly shorten MRI data acquisition time.

In MRI imaging, data is acquired into a signal space called a k-space, which is the Fourier transform space of the image. An image is usually reconstructed from the k-space by applying an FFT to the data in the k-space. A major difference between MRI methods is the order in which data is acquired into the k-space. For example, in spiral MRI, data is acquired along a spiral trajectory in a two dimensional k-space, while in spin echo MRI, data is acquired along individual rows in the k-space. In 3D MRI, the k-space is three dimensional.

The commonly used solution to non-uniformly spaced data points is to interpolate the data points onto a uniformly spaced grid. One method of interpolation (referred to herein as the GRD method) was originally devised for radio astronomy by W. N. Brouw in "Aperture Synthesis", B. Adler, S. Fernbach and M. Rotenberg, editors, *Methods in Computational Physics*, Vol. 14, pp. 131–175, Academic press, New York, 1975. This method was introduced into medical imaging by O'Sullivan in "A Fast Sinc Function Gridding Algorithm for Fourier Inversion", *IEEE Trans. Med. Imaging*, MI-4:200–207, 1985 and by Jackson et. al in "Selection of A Convolution Function for Fourier Inversion using Gridding", in IEEE Trans. Med. Imaging, MI-10:473–478, 1991, and further elaborated by Meyer et. al in "Fast Spiral Coronary Artery Imaging", *Magn. Reson. Med.*, 28:202–213, 1992, the disclosures of which are incorporated herein by reference.

In a conventional gridding method, resampling of data (in k-space) is applied as follows:

(a) Pre-compensate the sampled data with the inverse of the sampled data density, to compensate for the varying density of sampling in k-space.

(b) Convolute the data with a Kaiser-Bessel window function.

(c) Re-sample onto a uniformly spaced Cartesian grid.

(d) Perform an FFT on the redistributed set of data points to get an image.

(e) Post-compensate the transformed data to remove apodization of the convolution kernel by dividing the image data by the transform of the Kaiser-Bessel window function.

A Kaiser-Bessel convolution is used, rather than a sinc convolution, to reduce the computational complexity. The preferred convolution kernel is zero outside a certain window size, so that each resampled data point will be interpolated only from a small number of data points, in its vicinity, rather than using all or most of the data points in the set, as would be required in a sinc based interpolation.

The step of post-compensation is required to correct for a so-called roll-off effect induced by the transform of the convolution window. Even after the post compensation, there is generally a degradation of image quality towards the edges of the generated image. Two types of effects are generally visible: "cupping" and "wings". Cupping is where the intensity profile is lower (or higher) at the center of the image than at its ends and wings is where there is an overrun of the signal beyond the ends of the image carrying portion of the image. "Density Compensation Functions for Spiral MRI", by R. Hoge et al., in MRM 38:117–128 (1997), the disclosure of which is incorporated herein by reference, provides in FIG. 5D thereof a graphic example of both degradation effects for a Jackson type gridding algorithm. Such degradation is undesirable in medical images that are used for diagnosis. One solution is to interpolate onto a 2N×2N grid, rather than onto an N×N grid (oversampling). The result is then post-compensated and only the central N×N portion of the post-compensated result is persevered. Most of the artifacts are outside this central portion. However, this technique increases the number of points for the FFT, by a factor of four, which considerably increases the complexity of the computation.

In the performance of real time MRI imaging, e.g., imaging of the heart and imaging fluid dissipation in tissues, the number of computational steps allowed between sequential images should be kept to a minimum. Typically, the pre-compensation, convolution and resampling are performed by multiplying the column-stacked data by a suitable, pre-calculated, matrix of coefficients. In some cases, the pre-compensation is applied separately. The post-compensation requires an element-by-element multiplication by a pre-calculated matrix. The number of required calculations is very important in medical imaging since the size of MRI images can be as large as 1,024×1,024 or more.

An article titled "Comparison of Interpolating Methods for Image Resampling" by J. Parker et al, IEEE trans. on Medical Imaging March 1983, states that the choice of an interpolating function for resampling depends upon the task being performed. When verisimilar images are desired, this article suggests cubic B-spline interpolation. When additional processing of the images is to be performed the article suggests high-resolution cubic spline interpolation.

Another source of image degradation is noise. Substantially every sampled image includes noise, such as, thermal noise from the source of the sampled data and noise due to the apparatus used in acquiring the data. In resampling, the noise in the original data is passed over to the resampled data.

In medical images, certain types of noise are found to be more tolerable to the human observer than others. For example, as mentioned in the above referenced article, noise which is correlated with an image is much more noticeable than noise which is uncorrelated with the image. In viewing medical images, it is commonly desired to receive images which have a clear appearance, i.e. a low level of local noise, even if the received images are less accurate, i.e., have a higher bias.

U.S. Pat. No. 4,982,162 to Zakhor et al. and an article from the same author titled "Optimal sampling and Reconstruction of MRI Signals Resulting from Sinusoidal Gradients", IEEE transactions on signal processing, September 1991, the disclosures of which are incorporated herein by reference, describe derivation of a one-dimensional least square estimator matrix for generating an image from non-uniform sampled data, based on estimation theory. The estimator requires a matrix inversion which is time consuming. The time required for matrix inversion is a function of the number of sampled data points, which in two dimensional images is on the order of tens of thousands.

SUMMARY OF THE INVENTION

One object of some preferred embodiments of the invention is to provide a method of uniform resampling of data in one or more dimensions, which method is computationally efficient.

An object of some preferred embodiments of the invention is to provide a method of uniform resampling that does not introduce significant errors into an image reconstructed from the resampled data. Additionally, by not introducing errors, an extra step of correcting for those errors is not required. Alternatively or additionally, the variance of the errors is reduced, so that the errors are more uniformly distributed over the image.

An object of some preferred embodiments of the invention is to provide a method of data resampling which reduces the effect of the noise from the original data, on the resampled data.

An object of some preferred embodiments of the invention is to provide a method of data resampling which is computationally stable.

It is an object of some preferred embodiments of the invention to provide a method of data resampling, preferably for generating an image, which allows a user to control a tradeoff between an SNR of the image and a bias of the image.

In accordance with a preferred embodiment of the invention, data is resampled by determining interpolation coefficients that could be used to convert from uniformly spaced data to non-uniformly spaced data. These coefficients are inverted to determine interpolation coefficients that convert non-uniformly spaced data into uniformly spaced data. In a preferred embodiment of the invention, the coefficients are not inverted as one unit, which would be very time consuming. Rather, when inverting a particular coefficient, only coefficients in a (mathematical) locality of that coefficient are used to calculate the proper inversion.

One aspect of some preferred embodiments of the present invention relates to a method of resampling non-uniformly sampled data onto a uniform grid. The method is introduced by first examining the inverse problem, i.e., how to obtain a non-uniformly sampled data vector from a uniformly sampled data vector. The solution to the inverse problem is then inverted, to yield a solution to the forward problem. An equation Ax=b describes the relationship between a non-uniformly sampled data vector b, a uniformly sampled data vector x and a coefficient matrix A (e.g., sinc coefficients) which converts the uniformly sampled vector into a non-uniformly sampled vector. In a MRI example of the inverse problem, data from a uniformly sampled k-space is placed in vector x and multiplication by matrix "A" yields vector b of data corresponding to a non-uniformly sampled k-space. In the forward problem, data from a non-uniformly sampled k-space is stacked into vector b and multiplied by some matrix to obtain a uniformly sampled vector x.

In accordance with a preferred embodiment of the invention, the vector x is determined from vector b, by multiplying vector b with an inverse of coefficient matrix A, $A^\#$, i.e., $x=A^\#b$. In some cases, A is a non-square matrix, so a true inverse cannot be defined. Preferably, $A^\#$ is a pseudo-inverse of the coefficient matrix A, preferably a Moore-Penrose pseudo-inverse. In some cases, there may be a plurality of possible pseudo-inverse matrices. Preferably, a matrix that minimizes an error criterion is used. Preferably, the error criteria used is $|Ax-b|^2$. Preferably, the matrix which generates a minimum norm for x, is used.

In a preferred embodiment of the invention, $A^\#$ is found using a singular value decomposition algorithm (SVD), most preferably a rank-truncated SVD, for example as described in W. H. Press, et. al, "Numerical Recipes in C", Cambridge University Press, Cambridge, 2nd Edition, 1992, for the real case, and in S. L. Marple Jr., "Digital Spectral Analysis," Prentice-Hall, Inc., Englewood Cliffs, N.J., 1987, for the complex case. The disclosures of both these publications are incorporated herein by reference.

However, determining an SVD pseudo-inverse may be computationally expensive, especially where the matrix A is very large.

In accordance with a preferred embodiment of the invention, use is made of the fact that, during resampling, each resampled data point can be interpolated to an acceptable accuracy by using only a subset of the data points in its vicinity, rather than by using all the data points in the set. Rather than invert the entire matrix A as a single unit, an approximate inversion of matrix A is performed by decomposing the inversion problem into component problems. Each component problem relates a subset of points from vector b with a subset of points from vector x, using a subset of the coefficients from matrix A. Preferably, each subset of matrix A includes only coefficients which relate points in a limited portion of k-space. For example, an i'th sub-problem concerns relating the i'th point of vector x ($x_i$) with a small number of points from vector b, preferably using a subset of coefficients from matrix A. This subset is represented herein by an interpolation sub-matrix $A_i$. In a preferred embodiment of the invention, only sub-matrices $A_i$ are inverted (typically pseudo-inverted), giving matrices $A_i^\#$, rather than inverting the whole matrix A. In addition to relating $x_i$, the i'th sub-problem preferably also relates additional points from vector x, preferably points in the k-space neighborhood of $x_i$. However, generally, $A_i$ is chosen to have the smallest possible size which will still yield a good approximation for $x_i$ when matrix $A_i$ is inverted. In some preferred embodiments of the invention, a component problem may be used to relate more than one point in vector x to points in vector b, at a desirable accuracy.

The conversion of vector b into vector x is preferably performed by multiplying vector b by a composite inverted matrix $\mathcal{A}^\#$. The composite inverted matrix is preferably assembled from the inverted sub-matrices $A_i^\#$. For each pseudo-inverted sub matrix $A_i^\#$, one row corresponds to the interpolation coefficients required for its respective $x_i$. The i'th row of matrix $\mathcal{A}^\#$ is initialized to zero and subsequently the values from the corresponding matrix $A_i^\#$ are copied into the appropriate locations in the i'th row of $\mathcal{A}^\#$. The appropriate locations correspond to the locations of the points in b which were selected for the i'th problem. Ultimately, matrix $\mathcal{A}^\#$ comprises mostly zeros, thus, multiplying by $\mathcal{A}^\#$ requires fewer steps than multiplying by $A^\#$. In addition, $\mathcal{A}^\#$ takes up less storage space, as only the non-zero elements need be stored.

The size of each of the sub-matrices $A_i$ is dependent on the amount of original data used to interpolate each resampled data point. In accordance with one preferred embodiment of the invention, the sub-matrix size is determined so that points from a constant radius (in k-space) around the resampled point are used for the resampling. Alternatively, the sub-matrix size is determined responsive to the quality of data acquisition for that region of k-space. Thus, each resampled point may be interpolated from a different number of original data points.

In a preferred embodiment of the invention, not all the points in the locality of the resampled point are used for interpolation. Preferably, substantially only a minimum number of points necessary to comply with the sampling theorem are used for the interpolation. Preferably, the points are selected to be evenly distributed in the locality (the size of the sub matrix). Preferably, a few extra points will be used to obtain a certain degree of oversampling. Preferably, the oversampling is utilized to compensate for the selected points not being evenly distributed in the locality. Additionally or alternatively, the oversampling is utilized to compensate for the signal not being completely band-limited and/or to compensate for the effects of noise. In one preferred embodiment of the invention, some of the points are ignored. Alternatively, they are averaged. In some preferred embodiments of the invention, the number of points used for resampling is a constant. Alternatively or additionally, the number of points is restricted to a maximal value. In some cases, the size of the locality may be increased to allow for a minimum number of points to be included in the interpolation. Alternatively or additionally, the size of the locality is also limited, to be within a range of sizes. In some preferred embodiments of the invention, the size of the locality is fixed.

In accordance with a preferred embodiment of the invention, provision is made for filtering the resampled data, without adding any computational steps. Preferably, this is achieved by using a matrix $\Phi A^\#$, rather than a matrix $A^\#$, where $\Phi$, a convolution matrix, performs the effect of the filter, i.e., $x=[(\Phi A^\#)]b$. In some preferred embodiments of the invention, where $\mathcal{A}^\#$ is used instead of $A^\#$, each of the sub-matrices used to assemble $\mathcal{A}^\#$ is pre-multiplied by a portion of $\Phi$. Preferably, the k-space coverage of each sub-matrix of $\mathcal{A}^\#$, which coverage determines the size of the matrix, is selected to be larger than the impulse response of the filter used, so that the use of portions of the filter, rather than a whole filter, does not substantially affect the filter performance. Alternatively, the k-space coverage is selected to be at least larger than an important portion of the impulse response. The important portion is preferably defined as a portion which contains most of the energy of the impulse response.

It should be appreciated that the above described methods are better suited than prior art methods to handle an arbitrary order of acquisition of data in MRI, since a pre-compensation for local density is not required. An extreme example of an arbitrary data acquisition is a stochastic k-space trajectory, as described for example in "Frequency Resolved Single Shot MR Images Using Stochastic k-Space Trajectories", by K. Scheffler and J. Hennig, in *Magn. Reson. Med.*, vol. 35, pp. 569–576, 1996, the disclosure of which is incorporated herein by reference. In addition, some types of pre-compensation are tailored to the use of particular k-space trajectories and/or rates of travel along the trajectory, i.e., the gradients applied. By doing away with pre-compensation, in accordance with some preferred embodiments of the invention, there is less of a need to tailor the resampling technique to the imaging technique.

An aspect of some preferred embodiments of the present invention relates to a density pre-compensation matrix. Preferably, the density pre-compensation matrix includes elements which are negative. Preferably, the density pre-compensation matrix is calculated by finding a diagonal pre-compensation matrix which when it pre-multiplies matrix A and is pre-multiplied by a matrix A#, yields the identity matrix (or at least a minimum error with the identity matrix). In a preferred embodiment of the invention, the use of such a calculated pre-compensation matrix allows an independence from a k-space trajectory velocity profile. One example of a previously problematic k-space trajectory is a stochastic trajectory. Another example is variable density spiral MRI imaging, as described for example in J. R. Liao and J. M. Pauly and T. J. Brosnan and N. J. Pelc, "Reduction of Motion Artifact in Cine MRI Using Variable-Density Spiral Trajectories", *Magn. Reson. Med.*, vol. 37, pp. 569–575, 1997, the disclosure of which is incorporated herein by reference. Still another example is an MRI square-like spiral trajectory, described for example in A. Macovski and C. H. Meyer, "A novel fast-scanning system," *Works in Progress, Fifth Annual Meeting of the Society of Magnetic Resonance in Medicine*, 1986, pp. 156–157, the disclosure of which is incorporated herein by reference.

An aspect of some preferred embodiments of the invention relates to real-time CT image reconstruction. In faster CT machines, data is acquired using a fan beam and the data must be rebinned to form a parallel beam. In addition, the k-space acquired by most CT imagers is non-uniformly sampled. In order to apply some Fourier reconstruction methods, the k-space should preferably be uniformly resampled.

In some preferred embodiments of the invention, where the coefficient matrix is inverted using sub-matrices, use is made of the fact that data points in vector x are dependent mainly on a small number of points in vector b. In one preferred embodiment of the invention, data points are resampled as soon as the required corresponding data points are acquired into vector b and without waiting for a data vector to be acquired. Preferably, this use is applied to process partial updates of the values in k-space.

In a preferred embodiment of the invention, where a CT image is continuously updated, for example as described in PCT applications PCT/IL98/00074, filed on Feb. 12, 1998, titled "Real Time Dynamic Image Reconstruction" and PCT/IL98/00075, filed on Feb. 12, 1998, titled "On Line Image Reconstruction in Helical CT Scanners" and in U.S. Pat. No. 5,524,130, issued on Jun. 4, 1996, the above-described method can be applied to increase the rate and/or quality of image generation. In these references, a CT image is created using information from a previous and mostly overlapping image, in addition to a small amount of new information. In a preferred embodiment of the invention, data, from a plurality of projections, are arranged in a vector b. A vector x is resampled from the vector b, using a matrix $\mathcal{A}^\#$, where each sub matrix is preferably compatible with the size of a projection. When a new projection is inserted into the vector b, it is not necessary to resample the entire vector b into a new vector x. Rather, a new vector x can be reconstructed by $x_{new}=x_{old}+\mathcal{A}^\#(b_{new}-b_{old})$. Preferably, this equation is limited so that it is only applied to the new projection and to data points which are affected by the new data, such as being in their vicinity.

In accordance with an aspect of some preferred embodiments of the invention, resampling is performed using estimation theory. Resampled values of the data at the resampled points are determined so as to minimize an error criterion, such as the minimum variance unbiased (MVU) criterion, the maximum a-priori (MAP) criterion or the maximum likelihood (ML) criterion. The resampled values represent estimations of the sampled signal at the resampled points or estimations of a function of the signal, e.g., estimations of filtered values of the signal. In the following text, the term "sampled signals" refers to the pure signal without any accompanying noise. The term "sampled data", however, refers to the samples which include noise.

In some preferred embodiments of the present invention, each resampled value is estimated based on a sub-group of the sampled data points. Preferably, each resampled value is estimated based on a sub-group of the sampled points in its locality. Preferably, values of a sub-group of resampled points are estimated together based on a sub-group of the sampled points in a locality of the resampled points.

In some preferred embodiments of the present invention, the resampled data is estimated using linear estimation methods. Alternatively or additionally, non-linear estimation methods are used.

One aspect of some preferred embodiments of the invention relates to resampling using statistical information of the sampled and/or resampled data. Preferably, an optimal estimator for translating the sampled data onto the points of the desired resampled data is determined, given the statistical information. In a preferred embodiment of the present invention, the estimator comprises a function of the statistical information and of an interpolation matrix suitable for resampling in an opposite direction, i.e., from the resampled points to the sampled points.

In some preferred embodiments of the present invention, the sampled data is formed of a signal component and a noise component, and the statistical information relates to the noise component. Alternatively or additionally, the statistical information relates to the signal component and/or to the resampled data. Further alternatively or additionally, the statistical information relates to the correlation between the noise component and the signal component and/or the resampled data. In some preferred embodiments of the present invention, the statistical information comprises one or more moments of the noise components and/or of the signal components of the sampled data. Alternatively or additionally, the statistical information comprises joint moments of the signal and noise components, and/or joint moments of the resampled data with the noise and/or signal components. Preferably, the one or more moments comprise first and/or second order moments. Alternatively or additionally, the statistical information comprises a probability density function (PDF). In a preferred embodiment of the present invention, the statistical information comprises a signal-to-noise-ratio (SNR) of the sampled data. Preferably, a single SNR value is determined for substantially all the sampled points in a single acquisition session. Alternatively, different SNR values are used for different resampled points or for different sampled points.

In some preferred embodiments of the present invention, the statistical information represents characteristics of an acquisition apparatus. Preferably, the statistical information is determined at a calibration stage of the apparatus and is provided with the apparatus by a manufacturer of the apparatus. Further preferably, the statistical information is periodically updated based on manufacturer updates and/or based on cumulative information from acquisition procedures performed by the apparatus. Alternatively or additionally, the statistical information is selected from a predetermined table based on the nature of the specific data being sampled. Further alternatively or additionally, the statistical information is estimated from the sampled data of a current acquisition session.

In a preferred embodiment of the present invention, other interpolation coefficients are used in the resampling process in addition to or instead of the interpolation matrix. Alternatively or additionally, the estimator is dependent on other functions which take into account the values of the sampled data points and/or the positions of the data points.

An aspect of some preferred embodiments of the invention relates to setting parameters of a resampling process of sampled data, responsive to one or more attributes associated with the sampled data. Preferably, the parameters comprise parameters of an estimator. Preferably, the one or more attributes are determined during and/or immediately before or after the acquisition session in which the sampled data is acquired. Alternatively or additionally, the one or more attributes are determined from the sampled data.

In a preferred embodiment of the present invention, the sampled data is used for medical imaging of a patient. The one or more attributes preferably comprise the identity of the organ being imaged, the geometry of the organ, the age of the patient being imaged and/or other information about the patient. Alternatively or additionally, the one or more attributes comprise at least one characteristic of the acquisition process. The at least one characteristic of the acquisition process preferably includes an attribute of the sequence type, an acquisition sequence parameter and/or an attribute of an acquisition apparatus. Further alternatively or additionally, the one or more attributes comprise an attribute which represents the type of imaging sequence performed, e.g., the shape of the k-space.

In a preferred embodiment of the present invention, the one or more resampling parameters comprise a parameter which controls a tradeoff between a noise level and a bias in a reconstructed image.

In some preferred embodiments of the present invention, the one or more resampling parameters are used in selecting a resampling estimator. Preferably, based on the one or more attributes, an estimator is chosen from a predetermined list of estimators. Alternatively or additionally, the one or more attributes are used to choose an optimality criterion according to which the estimator is chosen. Further alternatively or additionally, the estimator used in resampling is a function of one or more of the resampling parameters. Preferably, the resampling parameters comprise statistical information regarding the sampled or resampled data.

In a preferred embodiment of the present invention, the one or more attributes are used to retrieve from a predetermined list, statistical information regarding the signal and/or noise components of the sampled data and/or a-priori statistical information regarding the resampled data. The predetermined list is preferably prepared based on a plurality of previous acquisition procedures.

In some preferred embodiments of the present invention, the determined one or more attributes associated with the sampled data are used in choosing and/or adjusting a filter for use in a filtering stage before and/or after the resampling.

An aspect of some preferred embodiments of the invention relates to resampling using an estimator which has one or more adjustable resampling parameters. A physician sets the adjustable parameters based on the particular application of the resampled data and/or according to trial and error. Alternatively or additionally, the adjustable parameters are determined iteratively so as to maximize a given function of the resampled data, preferably of a function of an image created from the resampled data.

Preferably, the adjustable parameters receive values along a continuum. Further preferably, the effect of the values of the parameters on the resampling is continuous. Alternatively or additionally, the adjustable parameters receive a discrete number of values.

In some preferred embodiments of the present invention, when the resampled data is used for generating an image the adjustable parameters are chosen from a first group of values. When the resampled data is used for other applications the adjustable parameters are chosen from other values.

There is therefore provided in accordance with a preferred embodiment of the invention, a method of resampling medical imaging data from a first spatial distribution of data points onto a second spatial distribution of data points, including determining a matrix of reverse interpolation coefficients for resampling data from the second spatial distribution onto the first spatial distribution, inverting a matrix based on the reverse interpolation matrix to determine forward resampling coefficients for resampling data from the first spatial distribution to the second spatial distribution, and resampling data from the first spatial distribution onto the second spatial distribution using the forward resampling coefficients.

Preferably, the matrix based on the reverse interpolation matrix includes inverting the reverse interpolation matrix.

Alternatively or additionally, the matrix based on the reverse interpolation matrix includes the sum of the reverse interpolation matrix multiplied by its Hermitian conjugate and a parameter matrix.

Preferably, the parameter matrix includes a diagonal matrix.

Preferably, all the non-zero elements of the parameter matrix are substantially equal.

Preferably, the parameter matrix includes a correlation matrix.

Preferably, the resampling coefficients include interpolation coefficients.

Alternatively or additionally, the resampling coefficients include estimation coefficients.

Preferably, determining the reverse interpolation matrix includes determining a real matrix.

Preferably, the second spatial distribution includes a uniform spatial distribution.

Preferably, the first spatial distribution includes a non-uniform spatial distribution.

Preferably, the second spatial distribution includes a radial spatial distribution or a Cartesian spatial distribution.

Preferably, the medical imaging data includes Magnetic Resonance k-space data.

Alternatively or additionally, the medical imaging data includes Magnetic Resonance imaging data.

Further alternatively or additionally, the medical imaging data includes Magnetic Resonance spectroscopy data.

Alternatively or additionally, the medical imaging data includes CT k-space data.

Further alternatively or additionally, the medical imaging data includes CT projection data, converted from fan-beam to parallel beam.

Further alternatively or additionally, the medical imaging data includes diffraction tomography k-space data.

Preferably, inverting includes calculating a pseudo-inverse matrix.

Alternatively or additionally, inverting includes inverting using rank truncated SVD (Singular Value Decomposition).

Preferably, the determining is performed locally on the first and second spatial distributions.

Preferably, the inverting is performed locally on the first and second spatial distributions.

Preferably, determining a matrix of resampling coefficients includes selecting $\overline{M}$ points from the second spatial distribution and $\overline{N}$ points from the first spatial distribution, for each of the localities.

Preferably, the $\overline{M}$ points are selected from a first region surrounding a point $x_i$.

Preferably, $\overline{M}$ is dependent on the locality.

Preferably, the first region is circular, having a first radius dependent on the locality.

Alternatively or additionally, the first region is non-circular and/or rectangular.

Preferably, the $\overline{N}$ points are selected from a second region surrounding a point $x_i$.

Preferably, $\overline{N}$ is dependent on the locality.

Preferably, the second region is circular, having a second radius dependent on the locality.

Alternatively or additionally, the second region is non-circular and/or rectangular.

Preferably, the resampling includes generating an inversion matrix and each row is created from an inversion at a locality.

Preferably, copying resampling coefficients resulting from the inversion into a zeroed matrix row of the inversion matrix, which row corresponds to point $x_i$.

Preferably, the determining is performed using a grid different from the second spatial distribution.

Preferably, the different grid has a greater extent than the second spatial distribution.

Alternatively or additionally, the different grid has a different spacing than the second spatial distribution.

Further alternatively or additionally, the different grid has a larger and/or smaller spacing than the second spatial distribution.

Preferably, the resampling includes pre-multiplying a matrix including the forward interpolation coefficients, by a filter.

Preferably, the filter has a FIR (Finite Impulse Response) and the FIR is smaller than an extent of the locality.

Preferably, the filter has an impulse response having most of its energy concentrated within an area smaller than an extent of the locality.

Preferably, the resampling includes resampling spatial data having dimensionality greater than one.

Preferably, reconstructing an image from the resampled data by applying an FFT (Fast Fourier Transform) to the data.

There is further provided in accordance with a preferred embodiment of the invention, a method of resampling including, providing data in a first spatial distribution of data points, providing a second spatial distribution of data points, and resampling data from the first spatial distribution onto the second spatial distribution, without generating artifacts in the data, which artifacts could be corrected by pixel-by-pixel multiplying an image reconstructed from the resampled data, by a pre-determined post-compensation matrix, the resampling being performed by multiplying the data by a single matrix.

Preferably, the single matrix is a sparse matrix in which each row includes at least 20% zero elements.

Further preferably, the single matrix is a sparse matrix in which each row includes at least 50% zero elements.

Further preferably, the single matrix is a sparse matrix in which each row includes at least 80% zero elements.

Preferably, the second spatial distribution includes a uniform spatial distribution.

Preferably, the first spatial distribution includes a non-uniform spatial distribution.

There is further provided in accordance with a preferred embodiment of the invention, a method of resampling including providing data in a first spatial distribution of data points, providing a second spatial distribution of data points, pre-multiplying the data by a diagonal density pre-compensation matrix which includes at least one element having a negative value, and resampling the data from the first spatial distribution onto the second spatial distribution.

Preferably, the diagonal pre-compensation matrix includes both positive and negative elements.

Preferably, the method includes reconstructing an image from the resampled data by applying an FT (Fourier Transform) to the data.

Preferably, the method includes pixel-by-pixel multiplying the reconstructed image by a pre-determined post-compensation matrix.

There is further provided in accordance with a preferred embodiment of the invention, a method of determining a diagonal density pre-compensation matrix, including providing a first spatial distribution of data points, providing a second spatial distribution of data points, determining a first interpolation matrix for resampling data from the first spatial distribution to the second spatial distribution, determining a second interpolation matrix for resampling data from the second spatial distribution to the first spatial distribution, and determining a diagonal pre-compensation matrix which minimizes an error between an identity matrix and the multiplication of the first and second interpolation matrices.

Preferably, the diagonal pre-compensation matrix includes elements having negative values.

Further preferably, the diagonal pre-compensation matrix includes both positive and negative elements.

Preferably, the first interpolation matrix is generated by multiplying two or more matrices.

Preferably, the determining a diagonal pre-compensation matrix includes generating a set of equations.

Preferably, generating a set of equations includes generating a matrix equation, which equation includes a multiplication relationship between a plurality of matrices.

Preferably, the plurality of matrices includes a backwards interpolation matrix, a diagonal pre-compensation matrix, an interpolation coefficient matrix and a convolution matrix.

Preferably, the method includes for each element on the diagonal of the diagonal matrix, selecting only a portion of the backwards interpolation matrix.

Preferably, the portion corresponds to portions of the backwards interpolation matrix which generate a non-zero value when multiplied by the diagonal element.

Alternatively or additionally, the portion corresponds to portions of the backwards interpolation matrix which correspond to uniformly sampled data points within a region in k-space surrounding a data point represented by the diagonal element.

Preferably, the region is circular or rectangular.

Preferably, selecting includes selecting only some of the parts of the backwards interpolation matrix which correspond to data points within the region.

Preferably, the portions include rows and/or columns.

Preferably, the method includes for each element on the diagonal of the diagonal matrix, selecting only a portion of the convolution matrix.

Preferably, the portion of the convolution matrix corresponds to uniformly sampled data points within a second region in k-space surrounding a data point represented by the diagonal element.

Preferably, the second region is circular or rectangular.

Preferably, selecting includes selecting only some of the parts of the convolution matrix which correspond to data points within the second region.

There is further provided in accordance with a preferred embodiment of the invention, a method of resampling data organized in a first spatial distribution of sampled data points onto a second spatial distribution of resampled data points, including, obtaining statistical information pertaining to the sampled data or the resampled data, and estimating the values of the resampled data points responsive to the obtained statistical information and to the sampled data.

Preferably, obtaining the statistical information includes acquiring data containing substantially only noise and determining the statistical information therefrom.

Alternatively or additionally, obtaining the statistical information includes guessing the statistical information.

Further alternatively or additionally, obtaining the statistical information includes estimating the statistical information from the sampled data.

Further alternatively or additionally, obtaining the statistical information includes estimating the statistical information using one or more sets of previously acquired sampled data.

Further alternatively or additionally, obtaining the statistical information includes retrieving the statistical information from a table.

Preferably, retrieving the statistical information from a table includes retrieving the information responsive to one or more attributes of the data.

Preferably, the one or more attributes include an identity of an organ represented by the data and/or a geometry of an imaged area and/or a determined noise level.

Preferably, obtaining the statistical information includes determining the statistical information based on a characteristic of an apparatus used to sample the sampled data.

Preferably, determining the statistical information includes determining based on a rate of sampling and a bandwidth of the sampled data.

Preferably, obtaining the statistical information includes obtaining statistical information regarding the resampled data and/or the sampled data.

Preferably, obtaining the statistical information includes obtaining statistical information regarding a noise component and/or a signal component of the sampled data.

Alternatively or additionally, the statistical information includes a signal-to-noise-ratio.

Further alternatively or additionally, the statistical information includes a probability density function (PDF) of the sampled data.

Preferably, the statistical information includes one or more statistical moments.

Alternatively or additionally, the statistical information includes correlation information.

Preferably, the statistical information includes auto-correlation information.

Preferably, estimating the values of the resampled data points includes determining for each of the resampled data points an estimator which is a function of the statistical information, and calculating the value of the resampled data point by applying the estimator to at least some of the sampled data points.

Preferably, the estimator includes a Bayesian estimator.

Alternatively or additionally, the estimator includes a non-linear estimator.

Alternatively, the estimator includes a linear estimator.

Preferably, the estimator includes a mean of a posterior PDF of the resampled data.

Preferably, the estimator is a function of a set of interpolation coefficients.

Preferably, the estimator includes an optimal linear Bayesian mean square error (MSE) estimator.

Further preferably, the estimator includes the equation $x = \mu_x + (A^H C_N^{-1} A + C_x^{-1})^{-1} A^H C_N^{-1}(b - A\mu_x)$, in which x represents the resampled data, b represents the sampled data, A represents the set of interpolation coefficients, and $C_N$, $C_x$, and $\mu_x$ represent the statistical information.

Alternatively or additionally, the estimator includes a function of a product of an interpolation matrix multiplied by its Hermitian conjugate and by a matrix which represents the statistical information.

Preferably, the estimator includes a function of a matrix inverse of the product of the interpolation matrix multiplied by its Hermitian conjugate and by the matrix which represents the statistical information.

Preferably, the estimator is of the form $x = (A^H C_N^{-1} A)^{-1} A^H C_N^{-1} b$, wherein x represents the resampled data, b represents the sampled data, A represents the set of interpolation coefficients, and $C_N$ represents the statistical information.

Preferably, the matrix which represents the statistical information includes a correlation matrix of a noise component of the sampled data.

Preferably, the interpolation matrix includes a real matrix.

Preferably, the set of interpolation coefficients includes interpolation coefficients suitable for resampling the second spatial distribution of data points onto the first spatial distribution of data points.

Preferably, the estimator minimizes an estimation error criterion.

Preferably, the estimation error criterion includes a root mean square error criterion.

Preferably, estimating the values of the resampled data points includes estimating responsive to a sub-group of the sampled data points.

Preferably, the sub-group of sampled data points of a resampled data point includes sampled data points in a region surrounding the resampled data point.

Preferably, estimating the values of the resampled data points includes estimating the values of a signal component of the data at the resampled data points.

Alternatively or additionally, estimating the values of the resampled data points includes estimating the values of a function of the data at the resampled data points.

Preferably, estimating the values of the resampled data points includes estimating filtered values of the data at the resampled data points.

Preferably, estimating includes solving a set of equations of the form $$E\left\{\left(x_i - \sum_{m=1}^{K} y_{im}(b_m + v_m)(b_k + v_k)\right)\right\} = 0,$$

in which $x_i$ represent the resampled data, $b_i$ represent a signal component of the sampled data, v represents a noise component of the sampled data, and $y_{im}$ represent the estimator.

Preferably, the sampled data includes medical imaging data.

Further preferably, the medical imaging data includes Magnetic Resonance k-space data.

Alternatively or additionally, the medical imaging data includes CT imaging data.

Preferably, the estimating includes estimating spatial data having dimensionality greater than one.

There is further provided in accordance with a preferred embodiment of the invention, a method of resampling medical imaging data organized in a first spatial distribution of sampled data points onto a second spatial distribution of resampled data points, including determining at least one attribute of the source of the data, and estimating the values of the resampled data points from the sampled data points responsive to the determined attribute.

Preferably, the at least one attribute includes an attribute of the object being imaged and/or an identity of a body part being imaged.

Alternatively or additionally, the at least one attribute includes an age group of a patient being imaged.

Preferably, the at least one attribute includes an attribute of an acquisition process of the sampled data.

Preferably, the at least one attribute includes an attribute of an acquisition sequence type.

Alternatively or additionally, the at least one attribute includes an attribute of an acquisition sequence parameter.

Alternatively or additionally, the at least one attribute includes an attribute of an acquisition apparatus.

Alternatively or additionally, estimating the values of the resampled data points includes selecting an estimator responsive to the determined at least one attribute.

Preferably, estimating the values of the resampled data points includes parametrically adjusting an estimator responsive to the determined at least one attribute.

Preferably, adjusting the estimator includes selecting parameters of the estimator from a look up table, responsive to the at least one attribute.

There is further provided in accordance with a preferred embodiment of the invention, a method of resampling data organized in a first spatial distribution of sampled data points onto a second spatial distribution of resampled data points, including providing an estimator which depends on a parameter independent of the first and second spatial distributions, setting a value of the parameter, and applying the estimator to the sampled data points to receive values for the resampled data points.

Preferably, providing the estimator includes selecting an estimator which minimizes an error criterion.

Preferably, the error criterion includes a weighted error criterion, the weights representing an importance of the accuracy of the values of the resampled data points.

Preferably, providing the estimator includes selecting an estimator according to availability of statistical information.

Preferably, setting the value of the parameter includes selecting a value from a discrete number of possible values or from a continuum of possible values.

Preferably, setting the value of the parameter includes setting the value responsive to an attribute of the sampled data.

Preferably, providing the estimator includes providing an estimator which is a function of an interpolation matrix.

Alternatively or additionally, providing the estimator includes providing an estimator which is a function of a sum of the interpolation matrix multiplied by its Hermitian conjugate and a parameter matrix.

Preferably, the parameter matrix includes a diagonal matrix and/or a correlation matrix.

Preferably, applying the estimator includes inverting the sum of the product of the interpolation matrix multiplied by its Hermitian conjugate and of the parameter matrix.

Preferably, inverting includes inverting using SVD.

Preferably, providing the estimator includes providing an estimator which is a function of a sum of a first parameter matrix and the product of the interpolation matrix multiplied by its Hermitian conjugate and by a second parameter matrix.

Preferably, the interpolation matrix includes a real matrix.

Preferably, applying the estimator includes applying the estimator to subsets of the sampled data.

Alternatively or additionally, applying the estimator includes applying the estimator so as to receive the values of the resampled data points responsive to respective surrounding sampled points.

Preferably, setting the value of the parameter includes setting the parameter separately for each of the subsets of the sampled data.

There is further provided in accordance with a preferred embodiment of the invention, a method of estimating a set of MRI-related values, including acquiring a set of MRI values which are related to the estimated MRI-related values through a linear model determining an association matrix which defines a linear association between a sub-group of the estimated values and a sub-group of the sampled values, and estimating the set of MRI related values by applying an estimating matrix to the sampled set of values, the estimating matrix being a function of the sum of a product matrix and a first parameter matrix, the product matrix being a product of the association matrix multiplied by its Hermitian conjugate and by a second parameter matrix.

Preferably, the first parameter matrix includes a diagonal matrix.

Alternatively or additionally, the second parameter matrix includes a unit matrix.

Preferably, the estimating matrix includes a function of an inverse of the sum of the product matrix and the first parameter matrix.

Preferably, the second parameter matrix includes a correlation matrix representing noise added to the sampled set of MRI values during acquisition.

Preferably, the association matrix includes a matrix of interpolation coefficients.

Preferably, applying the estimating matrix includes applying to a subset of the set of values.

There is further provided in accordance with a preferred embodiment of the invention, a method of resampling data organized in a first spatial distribution of sampled data points onto a second spatial distribution of resampled data points, including acquiring sampled data, and applying an optimal linear Bayesian mean square error estimator to the sampled data points so as to receive values for the resampled data points.

Preferably, applying the estimator includes setting arbitrarily at least one matrix of statistical data required by the estimator.

Preferably, setting arbitrarily includes assigning a diagonal matrix value.

There is further provided in accordance with a preferred embodiment of the invention, a method of resampling data organized in a first spatial distribution of sampled data points onto a second spatial distribution of resampled data points, including applying a first estimator to a first sub-group of the sampled data points to receive values for a first sub-group of the resampled data points, and applying a second estimator to a second sub-group of the sampled data points to receive values for a second sub-group of resampled data points.

Preferably, the second estimator is different from the first estimator.

There is further provided in accordance with a preferred embodiment of the invention, apparatus for resampling data organized in a first spatial distribution of sampled data points onto a second spatial distribution of resampled data points, including a medical imaging receiver which acquires the sampled data, an input interface which receives statistical information regarding the sampled data or the resampled data, and a processor which estimates the values of the resampled data points responsive to the statistical information and to the sampled data.

Preferably, the apparatus includes a memory which stores a look up table of statistical information suitable for various types of sampled data.

Preferably, the processor applies an optimal linear Bayesian mean square error estimator to the sampled data.

There is further provided in accordance with a preferred embodiment of the invention, apparatus for imaging, including a medical imaging receiver which samples a plurality of sampled data points, and a processor which resamples the sampled data points by applying an estimator to the sampled data points, and converts the resampled data points into an image, wherein the estimator is dependent on a parameter unrelated to the sampled data.

Preferably, the receiver includes an MRI receiver.

BRIEF DESCRIPTION OF FIGURES

The invention will be more clearly understood by reference to the following description of preferred embodiments thereof in conjunction with the figures, wherein identical structures, elements or parts which appear in more than one figure are labeled with the same numeral in all the figures in which they appear, in which:

FIGS. 9A–13D illustrate results of a resampling process, in accordance with a preferred embodiment of the present invention.

DETAILED DESCRIPTION OF THE PREFERRED EMBODIMENTS

One aspect of some preferred embodiments of the present invention relates to resampling of data sampled originally on a first grid, (e.g., a non-uniform grid), to a second grid, (e.g., a uniform grid). The problem of non-uniform sampling is especially acute in MRI, where images are typically reconstructed using a Fourier transform. The fast version of the Fourier transform (FFT) usually requires that the data be uniformly sampled. It is noted that the following description is applicable also to resampling from a first non-uniform grid to a second non-uniform grid even when the resampled grid is referred to herein as a uniform grid.

Figure 1:
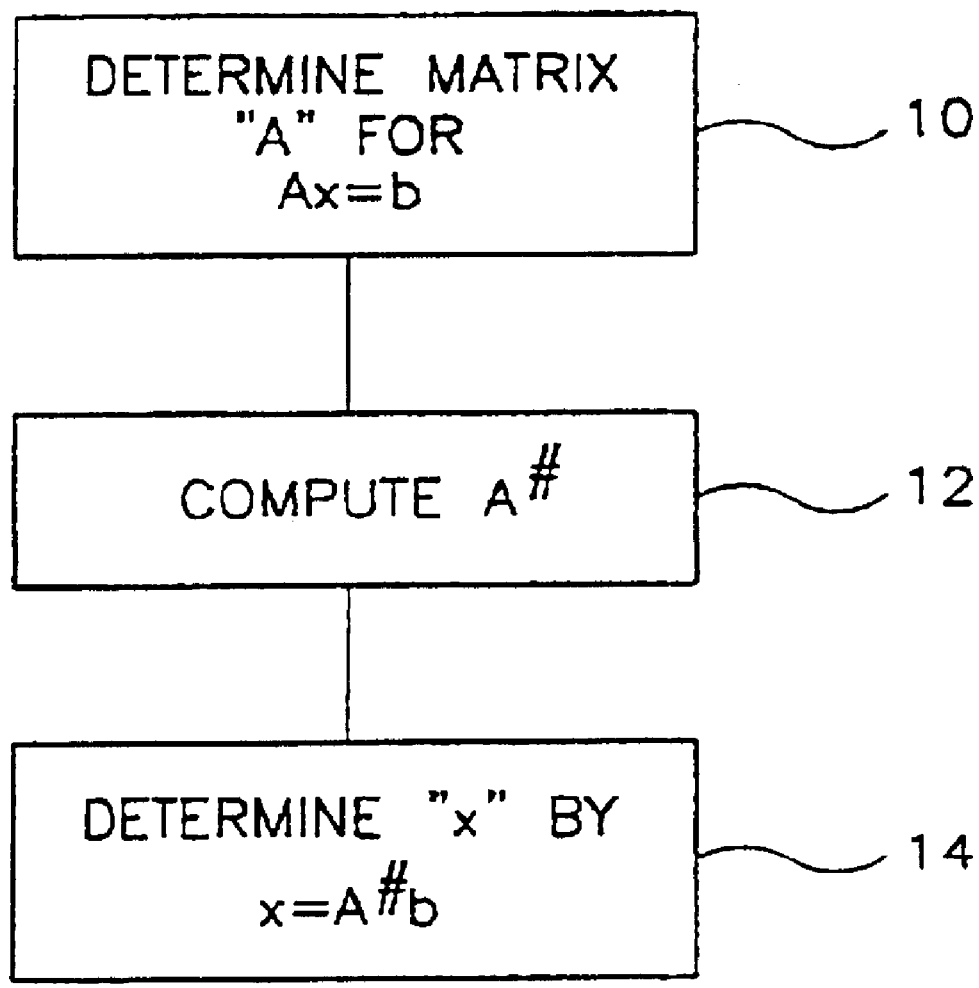
FIG. 1 is a flowchart of a method of uniform resampling of data, in accordance with a preferred embodiment of the invention.

FIG. 1 is a flowchart of a method of uniform resampling of data, in accordance with a preferred embodiment of the invention. In the following discussion, non-uniformly sampled data is arranged in a vector b comprising M data points. Uniformly sampled data is arranged in a vector x comprising N data points. A matrix "A" controls the interpolation between x and b: Ax=b. Thus, "A" is an interpolation matrix comprising interpolation coefficients which convert uniformly sampled data into non-uniformly sampled data. Matrix A is conventionally defined by:

$$a_{ji} = [A(M \times N)]_{ji} = K(\bar{b}_j - \bar{x}_i), \text{ for } i=1 \ldots N \text{ and } j=1 \ldots M$$

where

K(k) is an interpolation kernel. In one preferred embodiment of the invention a sinc kernel is used, where sinc x=(sin x)/x. Alternatively, other interpolation kernels may be used. An N-dimensional sinc kernel may be defined as:

$$K(\vec{k}) = K(k_1, \ldots, k_N) = \prod_{p=1}^{N} \text{sinc}(\pi k_p / \Delta k_p)$$

where $\Delta k_p$ is the distance between the uniformly sampled points (the grid spacing).

In a first step of the method of FIG. 1, matrix A is determined (10). In a preferred embodiment of the invention, a sinc interpolation is used. Next, a pseudo-inverse matrix $A^\#$ is computed from matrix A (12). In a preferred embodiment of the invention, a singular value decomposition method (SVD), preferably a rank-truncated SVD, is used for generating the inverse matrix. However, in other preferred embodiments of the invention, other matrix inversion methods may be used. Preferably however, the SVD method is used because it generates the minimum least squares error $|A^\# A - I|^2$. It should be noted that matrix A may in some cases be a square matrix, which can be properly inverted. However, in most cases, matrix A will be a rectangular matrix of size M×N.

Once $A^\#$ is determined, x is preferably calculated by applying $x = A^\# b$ (14). In a preferred embodiment of the invention, steps (10) and (12) are performed off-line, prior to the acquisition of data and preferably only once. Typically each data acquisition sequence/procedure (e.g., spiral MRI, EPI) will have different non-uniformities. However, in repeated applications of a particular sequence/procedure, most or all of the non-uniformities are similar. In a preferred embodiment of the invention, matrix A is determined by performing a calibration sequence with a known object, such as a phantom, so that the non-uniformities may be determined. "Improvement of Spiral MRI with the Measured k-Space Trajectory", by Xiaoping Ding, et al., in JMRI 1997; 7:938–940, the disclosure of which is incorporated herein by reference describes one example of determining an actual k-space trajectory which can be used for a gridding method.

The method of FIG. 1 may be considered optimal in some respects. However, when N and M are very large, the pseudo inverse of matrix A is prohibitive to compute. This is especially the case in MRI imaging, where M and N may each be ten thousand or more. In some cases, even if matrix $A^\#$ is known, multiplying a data vector by it may be a time consuming operation.

In one preferred embodiment of the invention, matrix $A^\#$ is clipped by setting to zero coefficients which are less important for the interpolation. Coefficients to be set to zero may be selected based on their relating to data points which are far away in k-space from the interpolated data point, based on their coefficient values being low and/or based on their coefficient values being inordinately high as compared to their distance from the interpolated point.

Figure 2:
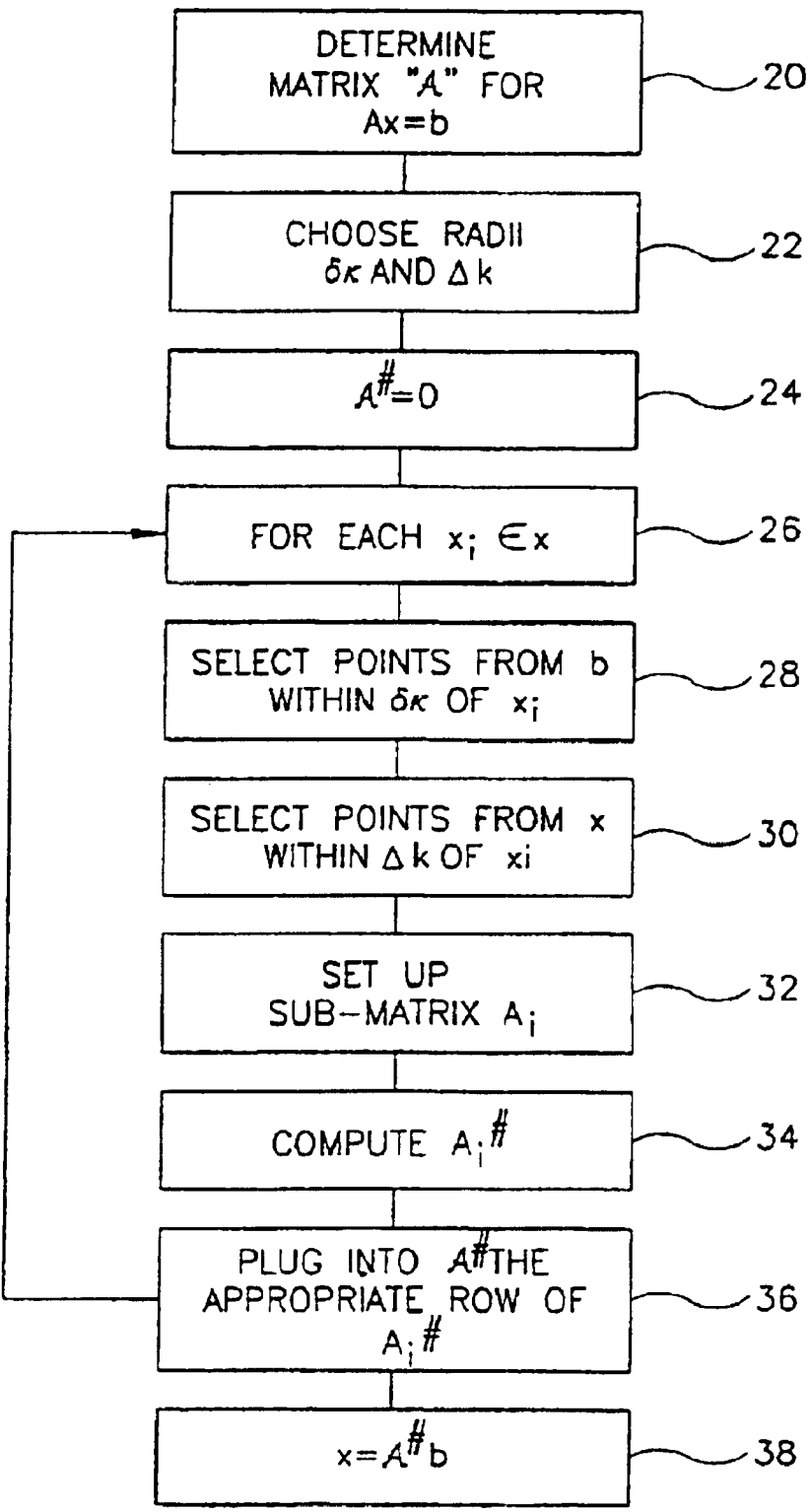
FIG. 2 is a flowchart of a method of uniform resampling of data, in accordance with another preferred embodiment of the invention.

FIG. 2 is a flowchart of a method of uniform resampling of data, in accordance with another preferred embodiment of the invention. In the method of FIG. 2, use is made of the fact that a value at a point may be interpolated to a reasonable accuracy using only points in its locality. A target matrix $\mathcal{A}^\#$ is constructed by determining interpolation coefficients for the locality of each data point and plugging the determined coefficients into the matrix.

As in the method of FIG. 1, matrix A, which solves the equation Ax=b, is determined (20). Next, the size of the locality is determined (22). There are two aspects to this determination, first the size of the locality from which non-uniformly sampled data point values are selected, δκ, and second, the size of the locality of uniformly sampled data point values which are interpolated simultaneously, Δk. Preferably, Δk>δκ. More preferably, Δk>1.5δκ. Further preferably, Δk>5δκ.

The target matrix $\mathcal{A}^\#$ is preferably initialized to zero (24). It should be noted however, that this step is a logical step and may not be required in some particular implementations of the present invention, especially if the matrix is stored as a sparse matrix.

For each point $x_i$ in the vector x of uniformly sampled data points, the interpolation coefficients are determined and then plugged into matrix $\mathcal{A}^\#$, as follows (26)–(36). A plurality of non-uniformly sampled data points is selected from b, such that all the points are within the radius δκ of $x_i$ (in the sampling space) (28). A plurality of uniformly sampled data points to be interpolated are selected which are within the distance of $\Delta k$ from $x_i$ (30).

A sub-matrix $A_i$ is set up which includes only those interpolation coefficients required to interpolate the selected non-uniformly sampled points from the selected uniformly sampled points (32). It should be appreciated that in some applications, for example, many MRI sequences, vectors b and x are unfolded (stacked) versions of a two- or three-dimensional data-space. As a result, the points that are selected in steps (28)–(30) are not usually all contiguous in k-space.

Matrix $A_i$ is then preferably inverted to compute $A_i^\#$ (34). In most cases the number of selected points within radius $\Delta k$ is different from the number of points selected within radius $\delta \kappa$ so $A_i$ cannot be properly inverted. In these cases, $A_i$ is preferably pseudo-inverted, preferably using an SVD algorithm.

In matrix $A_i^\#$, there is a row of interpolation coefficients which describe the interpolation of $x_i$ from a plurality of points in b. This row is preferably plugged into the i'th row of $A^\#$, by copying the coefficients into elements of the i'th row. The row may be identified by the correspondence between $x_i$ and the points selected in steps (28)–(30). Each element of the row is copied into a column location corresponding to a position in vector b from which a non-uniformly sampled data point was selected in step (28).

Once all the rows of $A^\#$ are calculated, vector x of uniformly sampled data points may be calculated from vector b of non-uniformly sampled data points using the equation $x = A^\# b$ (38). As can be appreciated, in many preferred embodiments of the invention, some or all the steps (20)–(36) may be performed off line, prior to the acquisition of data and only step (38) need be performed after the acquisition of data. In some preferred embodiments of the invention, especially where the non-uniformities are not pre-determined, steps (20)–(36) may be performed once for each data acquisition, possibly after the data acquisition. In some preferred embodiments of the invention, the data acquisition may be required to provide calibration data so that the non-uniformity may be determined.

Figure 3A:
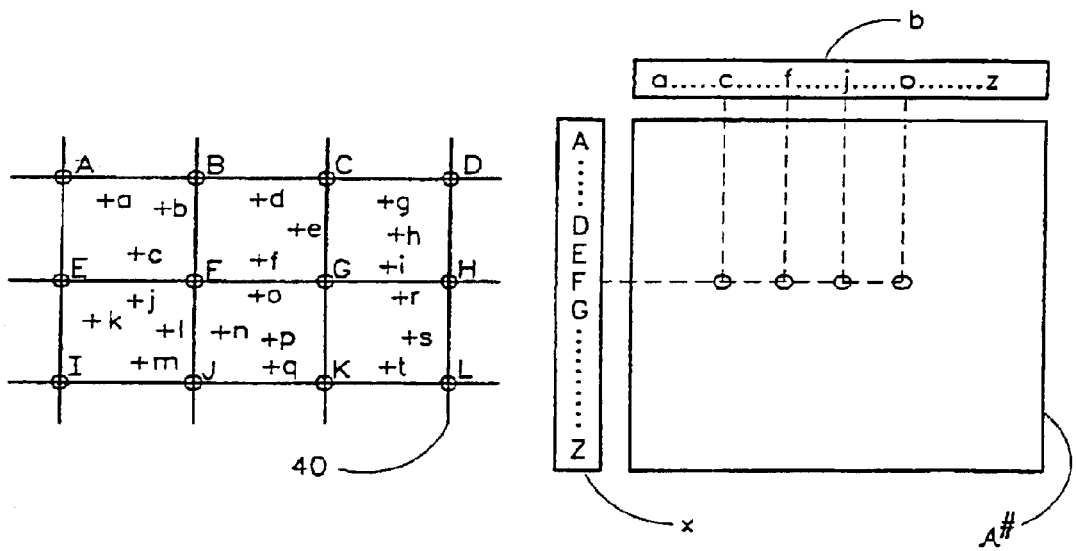
FIGS. 3A–E are schematic diagrams showing various types of correspondence between uniformly and non-uniformly sampled data points in a data-space, their associated data vectors and a matrix of resampling coefficients.

FIGS. 3A–E are schematic diagrams showing various types of correspondence between uniformly and non-uniformly sampled data points in a data-space, their associated data vectors and a matrix of resampling coefficients. Uniformly sampled data points from vector x are indicated with upper case letters, while non-uniformly sampled data points from vector b are indicated using lower case letters. All the points are indicated on a portion of a data-space 40. In FIG. 3A, a uniformly sampled data point F is indicated as being interpolated from points c, f, j, o, in its locality (all the other elements are preferably zero).

Two types of limitations may be applied in selecting the points for sub-matrix $A_i$. One type of limitation relates to the distance of the data points from the points to be interpolated. Another type of limitation relates to the number of points used for the interpolation. As can be appreciated, using fewer points may result in a degradation of quality but also generally decreases the computational complexity. Using distant points may also reduce the quality of the interpolation, but in some cases there may be too few close points. In addition, using distant points may increase the size of $A_i$, thus increasing the computational complexity. In some preferred embodiments of the invention, especially as exemplified below, one or both of these limitations may be applied in various manners.

In a preferred embodiment of the invention, a different weighting is assigned to points which are further away from the interpolated point. Preferably, the weight decreases with the distance. Alternatively or additionally, very close points are also assigned a relatively lower weight. Preferably, the different weight is incorporated in the interpolation kernel.

$A^\#$ is computed by first solving the inverse problem. A proper selection of $\Delta k$ and $\delta \kappa$ is necessary to provide a sufficiently robust set of interpolation coefficients in $A_i$, so that when it is inverted the coefficients in $A_i^\#$ are also robust. In the following discussion, $\bar{x}_i$ and $\bar{b}_i$ represent the sub-vectors of x and b, respectively, used in a particular i'th problem. In general, a particular point $x_i$ should preferably be interpolated from as many as possible points $\bar{b}_i$, to the limit of computational complexity and required precision. Matrix $A_i^\#$ should therefore contain a sufficient number $\overline{M}_i$ points $\bar{b}_i$ from b. However, this requires a sufficient number $\overline{N}_i$ of points $\bar{x}_i$ from x, used to construct matrix $A_i$. Preferably, $\overline{M}_i$ and $\overline{N}_i$ are at least partially determined by the selection of $\Delta k$ and $\delta \kappa$. When the point $x_i$ is near the edge of the k-space, there may be too few such points in its surroundings. Preferably, the grid of the k-space is continued to contain a plurality of "virtual" points $\bar{x}_i$. Each of points $\bar{b}_i$ can then be "interpolated" as a function of these "virtual" points $\bar{x}_i$. When the matrix is inverted, only $x_i$ is of interest, so the "virtual" points $\bar{x}_i$ can be ignored. Alternatively to continuing the grid, the grid may be mirrored and/or folded over.

As can be appreciated, the selection of $\overline{M}_i$ and $\overline{N}_i$ and the selection of $\Delta k$ and $\delta \kappa$ may be interconnected, as well as being dependent on their relative ratios and the local sampling density.

In accordance with a preferred embodiment of the invention, alternatively or additionally to a proper selection of $\Delta k$ and $\delta \kappa$, the grid may be modified in order to provide a more robust inversion (to make the interpolation coefficients well behaved). Non-robust inversion may be determined if the coefficient sum of rows of $A^\#$ is significantly different from the value 1. Alternatively or additionally, non-robust inversion may be determined by there being a large variance of the coefficients. In one preferred embodiment of the invention, a special uniform grid having a larger or smaller spacing than the uniform resampling grid is used for defining the inverse problem for each point $x_i$. This special grid preferably has an origin at the location of point $x_i$. Preferably the special grid has a larger spacing than the uniform resampling grid, for example, 1.5 or 2 times the spacing. In a preferred embodiment of the invention, a different spacing is determined for each point $x_i$. Preferably the spacing is dependent on the local density of sampling. Alternatively or additionally, the spacing is dependent on the spatial distribution of the non-uniformly sampled data points.

In accordance with another preferred embodiment of the invention, the uniform grid is inflated, for example by a factor of 2. This embodiment has the advantage of simultaneous decimation of the data, so that fewer computational steps are required.

In accordance with another preferred embodiment of the invention, it is the non-uniformly sampled grid which is modified, for example contracted. In any of the above embodiments it may be necessary to add "virtual" uniform-resampled points so that the non-uniformly sampled points are surrounded from all directions by uniformly sampled points.

In a preferred embodiment of the invention, the grids are inflated and/or contracted by an equal factor in each axis direction. Alternatively or additionally, a different factor is used for each axis.

Figure 3B:
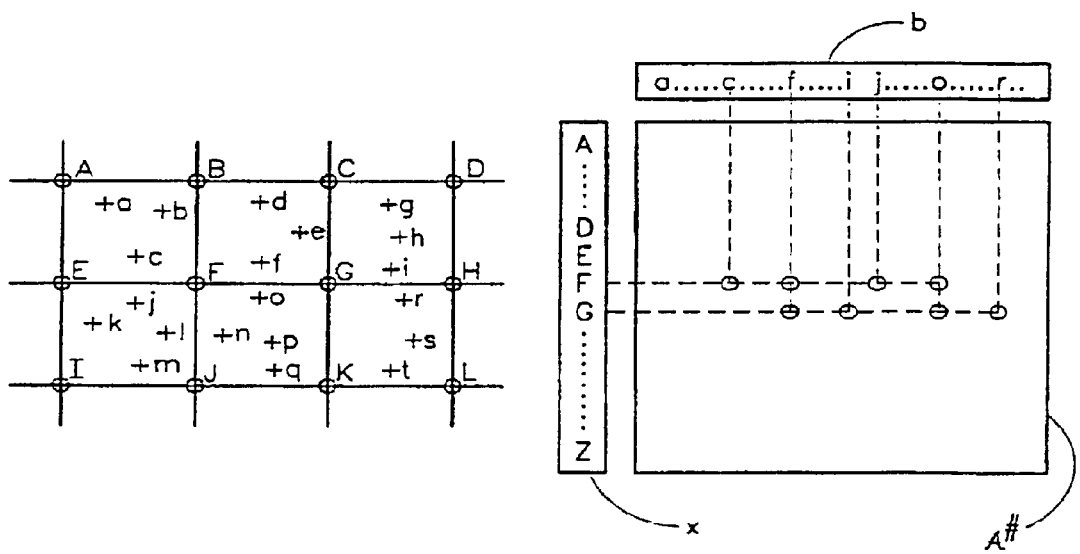

In FIG. 3B, two points, F and G, are indicated as being interpolated. It should be noted that F and G are interpolated, inter alia, from two common non-uniformly sampled points f and o. In the above described method it is preferred that each i'th row in $\mathcal{A}^\#$ be computed separately. However, in some preferred embodiments of the invention, a plurality of rows may be "plugged in" from a single matrix $A_i^\#$. In the example of FIG. 3B, points F and G have many common non-uniformly sampled data points. In these embodiments, matrix $A_i^\#$ will include enough points from b so that both F and G can be computed with a desired accuracy from $A_i^\#$. Alternatively or additionally, the number of inverted matrices may be reduced to effect a tradeoff between time and quality. As can be appreciated, for a given matrix $A_i^\#$ with n rows, n uniformly sampled data points $x_i$ can be interpolated. However, since the range of points from b is selected to be suitable for only a single point $x_i$, the other points will not be optimally interpolated. At a possible computational expense, the number of points $\overline{M}_i$ selected from data vector b may be increased so that more than one point $x_i$ can be properly interpolated. Alternatively or additionally, points $x_i$ for which an individual matrix $A_i^\#$ is not generated, will be selected based on the size of error which will be caused by their being interpolated using fewer than required points from b. Alternatively or additionally, individual matrices $A_i^\#$ will not be generated for points which, due to missing data, are interpolated from the same subset of points in b ($\overline{b}_i$). Alternatively or additionally, points $x_i$ which are to be interpolated at a lower quality are selected based on image considerations, such as the quality required in spatial and/or frequency sub-domains of the image.

Figure 3C:
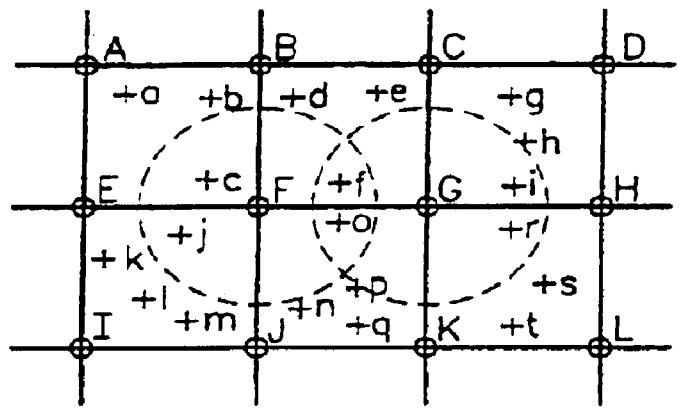

FIG. 3C illustrates an embodiment where two points $x_i$ are interpolated from points b which are within a fixed radius δκ from each point $x_i$. Typically, the radius will be larger than one grid unit. However, for illustrative purposes, a smaller radius is shown. In the example of FIG. 3C, the two interpolation areas also happen to include the same number of non-uniformly sampled points, however, this is not always the case.

Figure 3D:
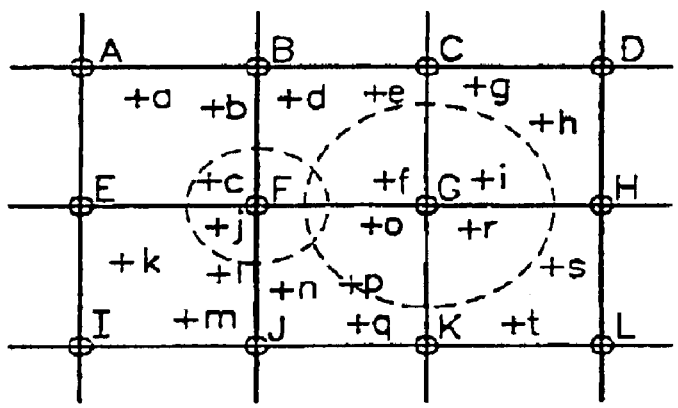

Alternatively to the radius always being a fixed size, different sized radiuses (both δκ and/or Δk) may be used for each point in $x_i$. One example of such an embodiment is shown in FIG. 3D. In one preferred embodiment of the invention, the radii are chosen so that each point $x_i$ will be interpolated from a same number of points in b. Alternatively, other considerations may be used. In a preferred embodiment of the invention, δκ≠Δk.

Figure 3E:
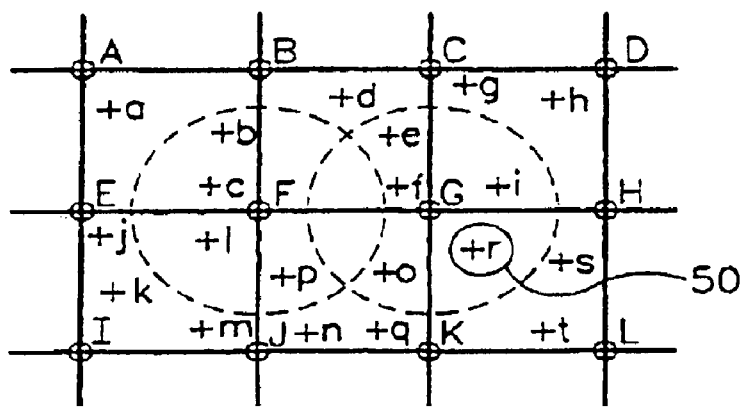

Alternatively or additionally, not all the data points within the radius are used for the interpolation. In FIG. 3E, the radii are the same for the two points, however, point G has more data points to be interpolated from. In one preferred embodiment of the invention, at least some of the data points are ignored in the interpolation, for example the indicated point r (50). Preferably, points are ignored based on there being enough data points which are used in their immediate vicinity. Alternatively or additionally to dropping points, extraneous data points may be averaged. Alternatively or additionally, other noise reducing methods which also reduce the number of data points may also be used. Dropping points may also be used to achieve decimation of the input points, since in some cases, the data is oversampled and/or a low resolution preview image is desired.

In a preferred embodiment of the invention, Δk and/or δκ are restricted to a maximum value, and/or a minimum value. Alternatively or additionally, the number of points in the area defined by one or both of the radii may be limited to a maximum number and/or a minimum number.

Although the points are described as being selected from circular areas, this is not the case in all the preferred embodiments of the invention. In one preferred embodiment of the invention, non-circular areas are used, for example, rectangular or arbitrarily, possibly asymmetric, shaped areas. In one example, if four points are desired for each interpolation, one in each quadrant relative to the interpolated point, it may not be desirable to increase the radii until there is at least one point in each quadrant. Rather, the selection area may be extended only in the necessary direction. It should be noted that some data acquisition procedures, such as spiral MRI, are acquired with some type of regularity, so that more than one point may have a similarly shaped non-circular selection area.

Alternatively or additionally, each point may have associated with it an individual selection area shape. Alternatively or additionally, each point may have associated therewith different restrictions on the number of points in the selection areas and/or on the extent of the areas. These restrictions, the selection area shapes and the type of interpolation performed at each point constitute the parameters which determine the interpolation.

In a preferred embodiment of the invention, at least one of the parameters which determine the interpolation at each point, are decided responsive to prior knowledge. In one example, these parameters are decided based on an expected noise level at each part of the data space. Alternatively or additionally these parameters are decided responsive to a desired data quality at each point in the data space and/or final image. Optionally, each point may have associated therewith a different data quality-, image quality-, and/or error-function. Alternatively or additionally, these parameters may be determined based on a calibration of an imaging system. For example, if a MRI system is calibrated to have a certain maximal field distortion, the radii may be limited for more than one MRI sequence, responsive to that maximal distortion.

In a preferred embodiment of the invention, values for the parameters are selected to meet criteria for image quality (local or global) and/or speed (maximum or minimum). Generally, the effect of different parameters will depend on the type of non-uniformities in data acquisition, as well as on other considerations, such as image quality, human perceptive abilities and/or noise distribution. The type of data acquisition may also effect these decisions, for example, in some type of data it may be important for each point $x_i$ to be interpolated from points which surround it in all directions. In other types of data acquisition, it may also be allowed to perform extrapolation, based on the values of data points on only one side of the point $x_i$.

One particular issue is selecting the points from b to be used in interpolated a point $x_i$. In one preferred embodiment of the invention, the optimal (quality vs. speed) selection may be made using an iterative, search mechanism, which tests various point selection strategies and/or parameter values.

In a preferred embodiment of the invention, the type of interpolation used is a sinc type interpolation. However, in other preferred embodiments of the invention, other interpolation types may be used, for example truncated sinc, Kaiser-Bessel, prolate spheroidal and others, preferably local interpolations. In one preferred embodiment of the invention, the interpolation coefficients are determined using a cubic spline.

It should be appreciated that matrix $\mathcal{A}^\#$ is a sparse matrix, so it may be stored in an efficient manner by not storing the elements with a zero value. Alternatively or additionally, multiplication of data vector b by matrix $A^\#$ can be more efficient, since only non-zero elements need to be considered in the multiplication.

The following table compares the absolute error generated by different data resampling methods for a particular simulated example. The error is determined by the equation $\epsilon=(A^\#A-I)$, where I is the identity matrix. The error is the sum of absolute values of the elements in matrix $\epsilon$. $A^\#$ is the resampling matrix according to each one of the methods.

| | Method | | | |
|---|---|---|---|---|
| | O'Sullivan | Jackson | FIG. 2 | FIG. 1 |
| Error | 114 | 62 | 41 | 0.00125 |

In this particular simulated example, the FIG. 2 method also had the attribute of the variance of the error over the image being lower than the Jackson method. Thus, the perceived image quality was considerably higher for the FIG. 2 method than for the Jackson method.

In a preferred embodiment of the invention, the uniform resampling may include a filter. In many medical imaging applications, the data is filtered prior to the FFT, for example, using an anti-aliasing low-pass filter. In a preferred embodiment of the invention, such filtering is incorporated in the interpolation matrix. Preferably, such incorporation does not increase the computational complexity of step (38) (FIG. 2), but does save computational time in forming an image from the data.

Filtering is performed in a k-space data by convoluting the uniformly sampled data with an appropriate filtering function, embodied by a convolution matrix $\Phi$. In the method of FIG. 1, the filtering can be achieved by pre-multiplying by $\Phi$: $x=[(\Phi A^\#)]b$. The composite matrix $\Phi A^\#$ may be stored and used in much the same manner as was matrix $A^\#$. Thus, resampling and filtering take the same amount of time as resampling alone.

In the method of FIG. 2, the filtering is incorporated in a slightly different manner. In step (34) $A_i^\#$ is pre-multiplied by a submatrix $\Phi_i$ of $\Phi$. The "plugging in" is performed by taking a row from the composite matrix $\Phi_i A_i^\#$.

As can be appreciated there may be an interaction between the filter and the size and type of area used for selecting interpolation points. Preferably, these parameters are modified so that the use of the filter adds only a minimum of artifacts to the data. Alternatively only certain filters are used, which match the selected parameters. Alternatively, a tradeoff is determined between the desired filtering and the computation effect of increasing the selection areas. In one preferred embodiment of the invention, the filter is non-uniform, so that it is adapted to variations in the interpolation parameters. In a preferred embodiment of the invention, the filter impulse response length is smaller than $\delta\kappa$.

In a preferred embodiment of the invention, the above described methods are applied to data sets having a dimensionality greater than two, for example three- or four-dimensional data sets. In addition, these methods are not restricted to a uniform resampling. Rather, they may be used to resample from any given data acquisition grid to a second data grid, providing a transformation matrix is known. One example of a non-uniform-to-non-uniform transformation is transforming a non-uniform sampling into a radially acquired k-space, as may be desirable for spiral MRI. Preferably, the information is directly reconstructed from the radial k-space by backprojection methods. An example of a uniform non-Cartesian grid is a hexagonal grid, as described for example in "MR Data Acquisition and Reconstruction using Efficient Sampling Schemes", by James C. Ehrhardt, in *IEEE Transactions on Medical imaging*, Vol. 9, No. 3, September 1990, the disclosure of which is incorporated herein by reference.

It should be appreciated that the method of FIG. 2 does not need to be applied to an entire data set. Rather, this method may be applied even to a portion of the data space. In one preferred embodiment of the invention, a user selects particular portions of the data set to which to apply a particular correction type. Alternatively or additionally, the method may be applied to a small portion of the image to determine which method of resampling will result in a better overall image. For example, if a dataset is resampled using one method, it is possible to resample only a portion of the data set and compare an error criterion on only that portion, to decide which method of resampling has a lower error rate.

In a preferred embodiment of the invention, matrix A and/or the interpolation parameters are determined, at least in part based on a calibration. In one preferred embodiment of the invention, the calibration is performed using a phantom having a known image/data acquisition. Alternatively, the calibration is performed using a reference scan. In one preferred embodiment of the invention, the reference scan may be a portion of the imaging sequence itself. Alternatively or additionally, the calibration is performed for only a portion of the data acquisition. Preferably, the calibration results may then be extended to cover the entire data acquisition space.

It should be appreciated that in accordance with a preferred embodiment of the invention, no pre-compensation of the non-uniformly sampled data is required. In accordance with a preferred embodiment of the invention, a method is provided for data pre-compensation for O'Sullivan- and Jackson-type re-gridding methods. The formula $x=C^{-1}B^Tb$ may be used to describe O'Sullivan's method of calculating x. $C^{-1}$, an inverse convolution matrix, represents the fact that post-compensation is required, so that instead of x being interpolated from b, it is actually Cx, which is interpolated. Matrix C may be defined by:

$$c_{in}=[C(N\times N)]_{i,n}=K(\bar{x}_i-\bar{x}_n), \text{ for } i,n=1\ldots N$$

where K is the Kaiser-Bessel function or a different function with a finite extent.

$B^T$ is a matrix which convolutes the non-uniformly sampled data with a convolution kernel and then resamples it onto a uniform grid, i.e., a backwards interpolation matrix. Matrix B may be defined by:

$$b_{ji}=[B(M\times N)]_{ji}=K(\bar{b}_j-\bar{x}_i), \text{ for } i=1\ldots N \text{ and } j=1\ldots M$$

Preferably, the same function is used for both matrices B and C.

Jackson suggested pre-multiplying each element of vector b by a density correction value, which value is the inverse of the local sampling density, to correct for the varying density of the data points. This may be represented as pre-multiplying vector b by a diagonal inverse-density matrix D. Conventional gridding methods can thus be represented by the formula $x=C^{-1}B^TDb$.

In accordance with a preferred embodiment of the invention, D is determined, preferably optimally. If $x=C^{-1}B^TDb$, then $C^{-1}B^TDA=I$. Defining $Q=C^{-1}B^T$ (Q having elements $q_{ij}$) results in the expression $QDA=I$. From this expression and based on the fact that D is a diagonal matrix, D is preferably determined by the following set of equations:

$$\sum_{j=1}^{M} (q_{ij}a_{jn})d_{jj} = \delta_{in}, \text{ for } i, n = 1 \ldots N$$

This is an over determined set of $N^2$ linear equations with M unknowns $d_{jj}$. In a preferred embodiment of the invention, D is determined using the pseudo-inverse of matrix A. This particular solution is optimal in terms of a minimal-norm least-squares sense. It should be appreciated that the resulting elements $d_{jj}$ are not necessarily positive, so a direct association with area density is not maintained. Referring to the above table, the absolute error for the Jackson method, using this optimal density correction function is 45. In a preferred embodiment of the invention, instead of using a pseudo inverse matrix $A^{\#}$, a pseudo-inverse matrix $A^{\#}$, as described with reference to FIG. 2, is used instead.

Other methods of determining D may also be used. In accordance with a preferred embodiment of the invention, the equation $C^{-1}B^{T}DA=I$ is solved by solving the equation $B^{T}DA=C$, in which case the following set of over determined equations is generated:

$$\sum_{j=1}^{M} (b_{ji}a_{jn})d_{jj} = c_{in}, \text{ for } i, n = 1 \ldots N$$

In accordance with another preferred embodiment of the invention, the equation $B^{T}DA=C$ is solved by multiplying both sides of the equation by suitable pseudo inverse matrixes, i.e. $D=(B^{T})^{\#}CA^{\#}$. Preferably, only the diagonal elements of the result are used for the density correction. Preferably, a pseudo inverse matrix $A^{\#}$, as described with reference to FIG. 2, is used. Alternatively or additionally, a pseudo inverse matrix $A^{\#}$, as described with reference to FIG. 1, is used. A pseudo-inverse matrix of the type derived with reference to FIG. 2 may also be used for inverting $B^{T}$, in accordance with some preferred embodiments of the invention.

Figure 4:
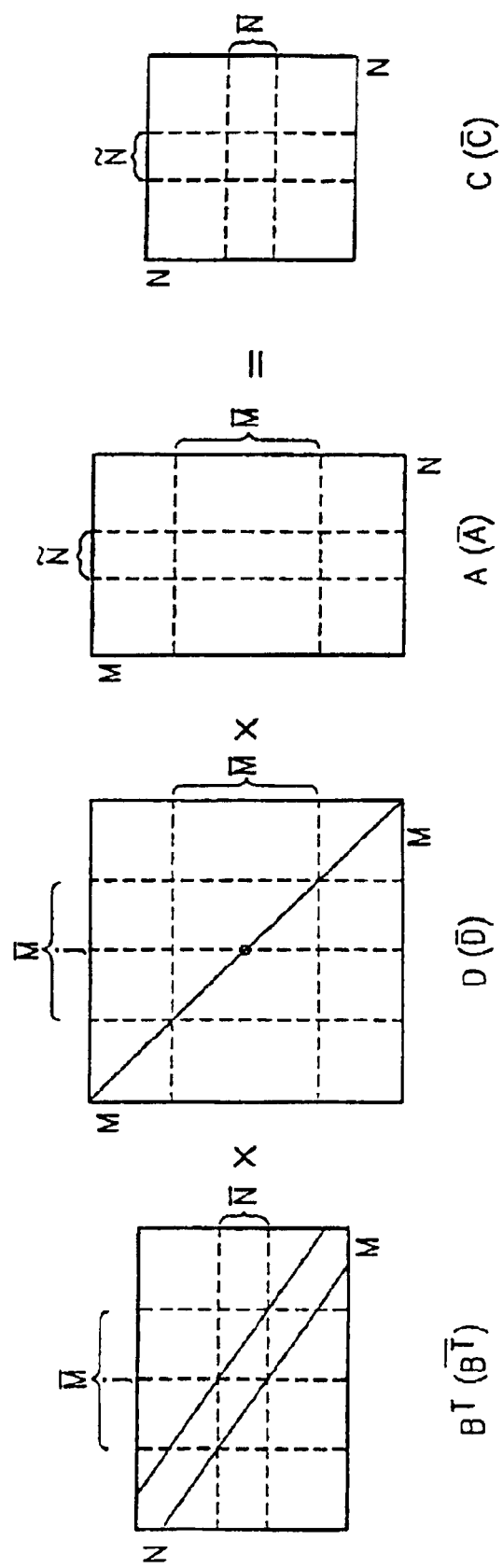
FIG. 4 is a schematic diagram illustrating the selection of matrix portions to multiply, in accordance with a preferred embodiment of the invention.

As can be appreciated, if M and N are large, the number of simultaneous equations in the above described methods may be very large. In a preferred embodiment of the invention, the matrices are analyzed so as to minimize the number of required simultaneous equations. FIG. 4 is a schematic diagram illustrating the selection of matrix portions to multiply, in accordance with a preferred embodiment of the invention.

Referring first to Matrix D, the j'th element ($d_{jj}$) does not take part in all the simultaneous equations. Matrix $B^{T}$ is a band diagonal matrix, so only $\overline{N}$ rows of matrix $B^{T}$ contain a non-zero element which will be multiplied by $d_{jj}$. Only $\overline{M}$ columns of Matrix $B^{T}$ contain non-zero element in these $\overline{N}$ rows. Thus, for a particular element $d_{jj}$, only a sub matrix $\overline{B}^{T}$ of $B^{T}$, having a size of $\overline{N} \times \overline{M}$, needs to be used in determining the simultaneous equations for element $d_{jj}$. As a direct result, only a sub-matrix $\overline{D}$ (of D) of size $\overline{M} \times \overline{M}$ needs to be considered for element $d_{jj}$. Consequently, only $\overline{M}$ rows of matrix A (i.e., a sub-matrix $\overline{A}$) needs to be considered for element $d_{jj}$. The resulting multiplication is a sub matrix $\overline{C}$ (of C) of size $\overline{N} \times N$.

In accordance with a preferred embodiment of the invention, $\overline{N}$ may be selected in a different manner. Preferably, $\overline{N}$ is selected to include only those rows of matrix $B^{T}$ which correspond to uniformly sampled points which are within a certain region surrounding the non-uniformly sampled point corresponding to element $d_{jj}$. Preferably the region is circular, however, non-circular regions, such as rectangular regions may also be used. Preferably, the region is selected by defining a region of interest of radius $\delta N$. The $\overline{M}$ columns of matrix $B^{T}$ are preferably selected, as before, to include all those columns in which the $\overline{N}$ rows contain non-zero elements.

It should be appreciated that $\overline{N}$ of this embodiment may be of a different size than the $\overline{N}$ of the previous embodiment. However, in some cases it will be larger and in some cases it will be smaller.

In a preferred embodiment of the invention, an additional reduction in computational steps can be practiced. The additional reduction can be practiced instead of or in addition to either of the other embodiments described with reference to FIG. 4. In this preferred embodiment of the invention, The equations are further limited by considering only a subset $\tilde{N}$ of the columns in matrix C. Preferably, this subset is defined by selecting only columns which correspond to uniform points in a certain region surrounding the point corresponding to element $d_{jj}$. Preferably, this region is circular, of a radius $\Delta N$. Alternatively, the region may be rectangular or of another shape.

Thus, in a preferred embodiment of the invention, the equations which correspond to an element $d_{jj}$ are determined by multiplying a sub matrix $B^{T}$ ($\overline{N} \times \overline{M}$), of matrix $\overline{B}^{T}$, by a sub matrix $\overline{D}$ ($\overline{M} \times \overline{M}$), of matrix D, by a submatrix $\overline{A}$ ($\overline{M} \times \tilde{N}$) of matrix A to result in a submatrix $\overline{C}$ ($\overline{N} \times \tilde{N}$), of matrix C. Each of these sub-matrices is preferably determined for each element $d_{jj}$ of D. Although $B^{T}$ is shown as a band-diagonal matrix, it should be noted that in a two-dimensional case, matrix $B^{T}$ will not look like a band-diagonal matrix, due to the two-dimensional spatial relationship between data points, however, there will still be only a few elements in each row which are not zero.

In accordance with a preferred embodiment of the invention, $\overline{M}$ is made smaller or larger by selecting only those columns of $B^{T}$ which correspond to non-uniformly sampled points within a given region around the non-uniformly sampled point associated with $d_{jj}$.

In some preferred embodiments of the invention, when selecting only rows or columns from a matrix which correspond to data points in a certain region of the k-space, not all the rows or columns which correspond to points in the region are selected. Rather, the selection may ignore a certain number of the points. Preferably, the ignored points are selected so that the points which are used are more evenly distributed or match a different distribution profile. Alternatively or additionally, the region size is selected to contain a certain number of points. Alternatively to ignoring points, points (and their corresponding rows and columns) may be weighted differently based on their distance from the point on which the region is based. In a preferred embodiment of the invention, the size and/or shape of the regions for which points are selected may be different for each point. Preferably, the two areas, defined by $\Delta N$ and $\delta N$ are approximately the same size, preferably 3 or 4 (uniform) grid units. Alternatively or additionally, they are of different sizes.

Figure 5:
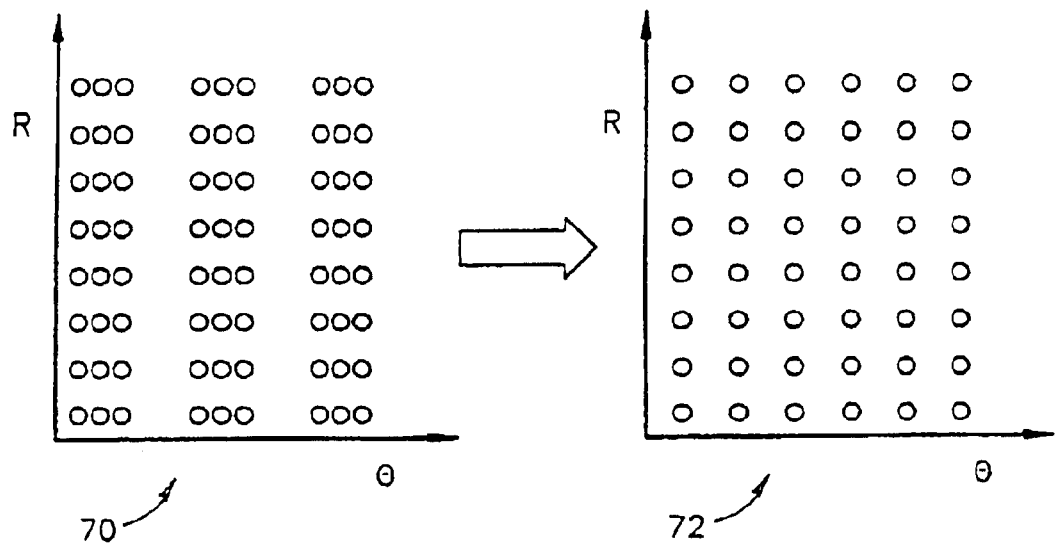
FIG. 5 is a schematic diagram of a fan-beam to parallel beam conversion, in accordance with a preferred embodiment of the invention.

FIG. 5 is a schematic diagram of a fan-beam to parallel beam conversion, in accordance with a preferred embodiment of the invention. In more modem X-ray CT imagers and in some gamma cameras, the data is acquired using a fan beam. However, the reconstruction algorithms, including back projection, require that the data be rebinned into parallel beams. Due to the fact that the data is actually acquired using a fan beam, the rebinned data is not uniform. FIG. 5 shows schematically rebinned, non-uniformly sampled data 70 and the desired uniformly sampled data 72.

It should be appreciated that some parts of the data space may be over-sampled. In accordance with a preferred embodiment of the invention, one of the above described binning methods is used to resample data 70 to yield uniformly sampled data 72. Alternatively or additionally, such resampling may be used in early generation CT devices, in which a parallel beam is used. Alternatively or additionally, such resampling is used for interpolation of data points for spiral scanning. Alternatively or additionally, such resampling is used for cone beam rebinning, in which case a three-dimensional space may need to be resampled.

In accordance with a preferred embodiment of the invention, the resampling method of FIG. 2 is utilized in real-time imaging. In this embodiment, use is made of the fact that each projection in a CT image (or in a radial MRI sequence), affects only data points in its vicinity, and not all the data in the data space. In a preferred embodiment of the invention, only a small portion of the data space is updated. The entire data space may then be processed to generate an image in which only some of the underlying data was replaced. In a preferred embodiment of the invention, matrix $A$ is decomposed into (possibly overlapping) sub matrices, each corresponding to those data points which are affected by the new data. Generally, only data points which are near (in the data-space) to the new data, are affected thereby. When a new projection is acquired, only the portion of the matrix which corresponds to the new projection is used, i.e.: $x_{new} = x_{old} + A_p (b_{new} p - b_{old} p)$, where the p index indicates the data limited to the particular projection.

Additionally or alternatively to continuous reconstruction of CT images, the above method may be used for fast preprocessing of CT data, since the data can be resampled as soon as the data points in its neighborhood are acquired, and without waiting for all the data to be acquired.

It should be appreciated that the above discussion is not limited to CT projections, rather it may be applied to any type of acquisition of partial data into a data space, for example multiple projections, spirals paths and areas. In addition, these methods may be applied in MRI, for example multi-shot spiral or radial scans.

Figure 6:
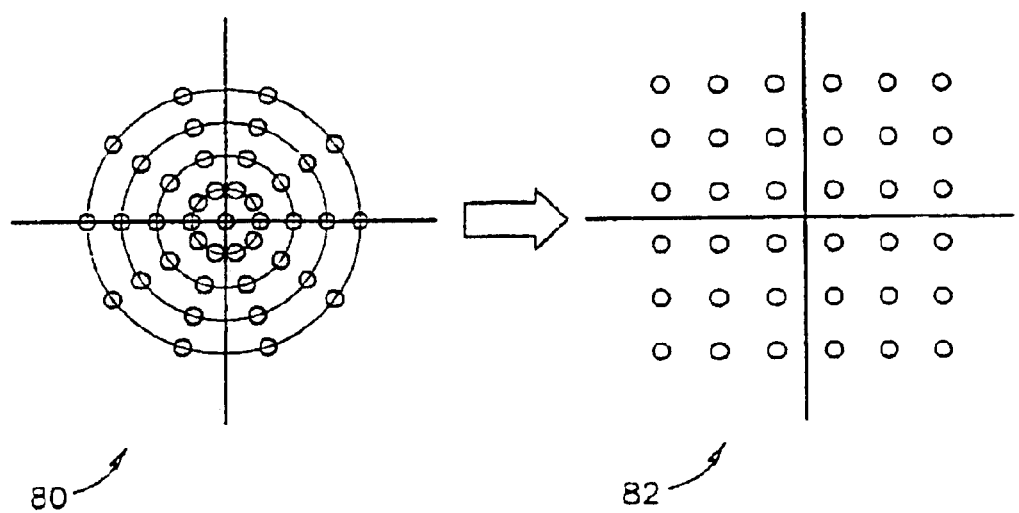
FIG. 6 is a schematic diagram of a k-space, as acquired by a typical CT imager and conversion to uniform sampling.

FIG. 6 is a schematic diagram of a k-space 80, as acquired by a typical CT imager. Two main types of image reconstruction methods are commonly used for CT: filtered backprojection reconstruction and Fourier reconstruction. Of the two, filtered backprojection is suited for radially sampled k-spaces, for example k-space 80. Performing Fourier reconstruction requires resampling the data into a Cartesian grid, as shown for example by a k-space sampling 82. In accordance with a preferred embodiment of the invention, the above described resampling methods are used for resampling the data from a radial layout onto a Cartesian grid. In a preferred embodiment of the invention, such resampling is used for MRI imaging, for example for radial and/or circular scans.

It should be noted that in Fourier reconstruction, the data for each projection is transformed using a 1D Fourier transform along the projection line before doing the resampling. In a preferred embodiment of the invention, the data is resampled to be uniform in the projection direction before performing the Fourier transform. Preferably, the resampling is performed using one of the resampling methods described herein. Alternatively or additionally, a standard gridding method is used.

In accordance with another preferred embodiment of the invention, the above method of resampling is used in diffraction tomography. "A computational Study of Reconstruction Algorithms for Diffraction Tomography: Interpolation Versus Filtered Backprojection", by S. X. Pan et al., in *IEEE Transactions on Acoustics, Speech, and Signal Processing*, Vol. ASSP-31, No. 5 October 1983, the disclosure of which is incorporated herein by reference, describes data acquisition and reconstruction for diffraction tomography. In particular, FIG. 5 of this article shows that data is acquired along arcs in k-space. In accordance with a preferred embodiment of the invention, the resampling methods described herein are used to resample diffraction tomography data to lie along these arcs. Alternatively or additionally, the data is resampled into a radial or a Cartesian grid for backprojection or Fourier reconstruction, respectively.

One aspect of some preferred embodiments of the present invention relates to resampling using estimation theory. By formulating the problem of resampling as an estimation problem, additional insight is achieved on the methods of the above described preferred embodiments, and of other resampling methods known in the art. In addition, new resampling methods are developed based on estimation theory. In some preferred embodiments of the present invention, resampling using estimation theory takes into account that the sampled data includes an additive noise component in addition to a signal component. Available statistical information regarding the sampled data and/or regarding the resampled data, and/or assumptions and guesses of the statistical information, are used to improve the accuracy of the resampled data. Alternatively or additionally, one or more adjustment parameters are inserted into the resampling method allowing adjustment of the resampling method according to user preferences.

Estimation theory is described, for example, in "Fundamentals of Statistical Signal Processing: Estimation Theory", by S. M. Kay, Prentice Hall, 1993, in "Estimation Theory and Applications", by N. E. Nahi, John-Wiley, 1969, in "Detection, Estimation and Modulation Theory" by H .L. Van Trees, John-Wiley, 1968, in "Probability, Random Variables, and Stochastic Processes", by A. Papoulis, ($3^{rd}$ Ed), McGraw-Hill, 1991, in "Signal Processing", by M. Schwartz and L. Shaw, McGraw-Hill, 1975, and in "Digital Processing of Random Signals", by B. Porat, Prentice-Hall, 1994, the disclosures of which are incorporated herein by reference.

Figure 7:
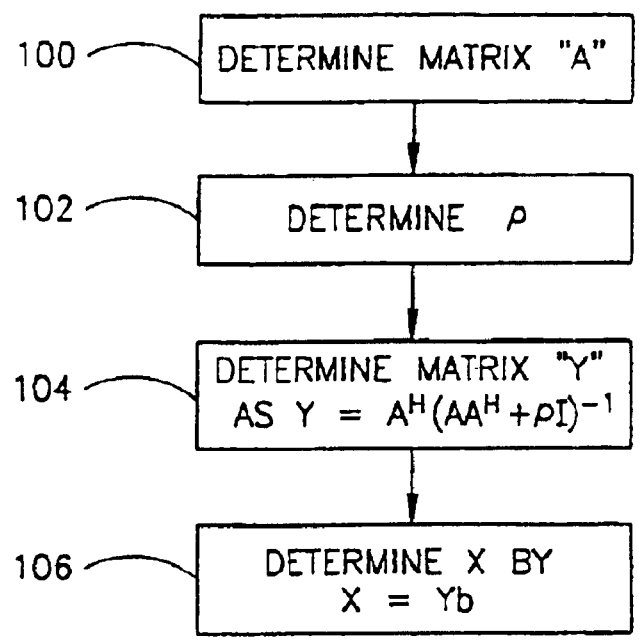
FIG. 7 is a flowchart of a method of resampling data using linear estimation, in accordance with a preferred embodiment of the invention.

FIG. 7 is a flowchart of a method of resampling of data using linear estimation, in accordance with a preferred embodiment of the invention. As in the above discussion, the non-uniformly sampled data is arranged in a vector b comprising M data points. The calculated uniformly sampled data is arranged in a vector x comprising N data points. An estimation matrix "Y" controls the determination of x based on b, i.e., x =Yb.

Interpolation coefficients for converting between the uniform and non-uniform points are preferably determined (100). In a preferred embodiment of the present invention, the determined interpolation coefficients are in the form of an interpolation matrix A, which is suitable for interpolating data from the uniform points to the non-uniform points. Preferably, matrix A is determined as described above with reference to FIG. 1. However, matrix A may be determined using substantially any suitable prior art method, such as gridding. In addition, a parameter ρ, the purpose of which is described below, is preferably determined (102).

In a preferred embodiment of the present invention, ρ is determined based on the signal-to-noise ratio of the sampled data. Preferably, during each acquisition session the acquisition system is operated without applying a signal, or in a manner in which the signal component of the sampled data is zero or otherwise known, in order to determine the noise level and hence the SNR. Alternatively or additionally, the noise level is determined at a calibration stage of the acquisition system. Further alternatively or additionally, the noise level or the SNR are selected based on knowledge of the acquisition system and/or of the acquisition conditions of the acquisition session. The acquisition conditions may include for example, the time, date of the acquisition session, the identity of a patient on which the acquisition is performed and/or the identity of an organ being imaged.

Estimation matrix Y is preferably calculated (104) based on the interpolation coefficients and the SNR. In a preferred embodiment of the present invention, matrix Y is calculated according to the following equation:

$$Y = A^H (AA^H + \rho I)^{-1} \quad (1)$$

in which $\rho$ is a parameter preferably related to the noise component of the sampled signals, $X^H$ represents the Hermitian conjugate (which when A is a real matrix reduces to the matrix transposition) and I is preferably a unit matrix of the dimensions of $AA^H$. Alternatively. The following, substantially equivalent form of equation (1), is used to calculate matrix Y: $Y = (A^H A + \rho I)^{-1} A^H$, in which I is a unit matrix suitable dimensions. In a preferred embodiment of the present invention, $\rho$ is the inverse of the SNR of the sampled signals. Thus, matrix Y resembles in form a pseudo inverse of matrix A but incorporates the effect of the noise component of the sampled data. This is especially evident when setting $\rho=0$, e.g., when there is no noise component in the sampled signals, in which case equation (1) turns into $Y = A^H (AA^H)^{-1}$ (or $(A^H A)^{-1} A^H$) which is equivalent to the pseudo inverse matrix ($A^\#$) in the undetermined (overdetermined) minimum norm case. Hence, the method of FIG. 7 converges to the method of FIG. 1. The uniform data points are thereafter calculated (106) using the equation x=Yb.

It is noted that when the resampled data is used for creating an image, $\rho$ provides a tradeoff between the noise level and the bias of the image. In a preferred embodiment of the present invention, resampling is performed for a plurality of values of $\rho$ and the results of the resampling best suited in the eyes of the physician are selected. Alternatively or additionally, the physician chooses, based on prior resampling sessions, a value of $\rho$ most suited for his/her needs. Further alternatively or additionally, the value of $\rho$ is selected based on the identity of the patient, the environmental conditions during the acquisition session, or any other relevant information.

In some preferred embodiments of the present invention, rather than calculating a single matrix Y for converting the non-uniform data to uniform points, sub-matrices are calculated for sub-groups containing $\overline{N} \leq N$ uniform points and $K \leq M$ non-uniform points.

In some preferred embodiments of the present invention, each row $y_i$ of matrix Y corresponding to one of the uniform points ($x_i$), is calculated separately. Preferably, row $y_i$ is calculated based on a submatrix ($\tilde{A}[K \times N]$) of matrix A which includes the K rows of matrix A which correspond to a group of K non-uniform points in the vicinity of uniform point $x_i$. The group of K non-uniform points in the vicinity of $x_i$ are selected using the radius $\delta \kappa$, or any other alternative method, for example, as described hereinabove with reference to FIGS. 2 and 3A—3E. Thus, equation (1) takes the form:

$$y_i = (\tilde{A}\tilde{A}^H + \rho I)^{-1} \tilde{a}_i \quad (2)$$

in which $\tilde{a}_i$ is the i'th column of $\tilde{A}$, i.e., the column which corresponds to uniform point $x_i$. Using equation (2), the complexity involved in calculating the rows of matrix Y is considerably reduced. Matrix Y is preferably assembled using the column vectors $y_i$ calculated by equation (2) for each uniform point $x_i$, in a manner analogous to the formation of matrix $A^\#$ as described above with reference to FIGS. 2 and 3A–E. Preferably, matrix Y is stored efficiently, for example by storing only non-zero elements.

In some preferred embodiments of the present invention, alternatively or additionally to using only K rows of matrix A in forming submatrix $\tilde{A}$, a sub-group of $\overline{N}$ uniform points is used in forming submatrix $\tilde{A}$. The $\overline{N}$ points are preferably chosen using radius $\Delta k$ or any other method as described hereinabove.

In some preferred embodiments of the present invention, $\rho$ in equation (1) is a function of the location of the resampled points. Preferably, the noise level (or other attribute on which $\rho$ depends) is determined separately for each area of sampled points and $\rho$ is adjusted accordingly. Alternatively or additionally, areas of sampled points which include high levels of noise are given higher values of $\rho$ in order to lower the noise level in those areas. Other areas are given lower values of $\rho$ so as not to increase the bias of the resampled points unnecessarily. Further alternatively or additionally, $\rho$ is set by the physician as a function of the area.

The matrix inversion in equations (1) and (2) involves a square matrix and therefore may be performed using conventional matrix inversion methods. Nonetheless, any of the matrix inversion methods described above may be used to perform the inversion, such as rank-truncate SVD, in order to reduce the calculation complexity of the inversion and/or to add robustness to the result.

In a preferred embodiment of the present invention, equation (1) is calculated as follows. Matrix A ($\tilde{A}$ in equation (2)) is decomposed into $A = U\Sigma V^H$ in which U, V are square unitary matrices, and $\Sigma$ is a diagonal matrix of the form $$\sum = \begin{pmatrix} D & 0 \\ 0 & 0 \end{pmatrix},$$

$D = \text{diag}(\sigma_1, \sigma_2, \ldots, \sigma_L)$. Substituting this decomposition notation into equation (1) provides us with $Y = V\Sigma^H U^H (U\Sigma V^H V \Sigma^H U^H + \rho I U U^H)^{-1}$ which can be reduced to $Y = V\Sigma^H (\Sigma \Sigma^H + \rho I)^{-1} U^H$. The term $(\Sigma \Sigma^H + \rho I)$ which is inverted, is equal to $\text{diag}(\rho + \sigma_1^2, \ldots, \rho + \sigma_L^2, \rho, \rho, \ldots, \rho)$ and therefore is easily inverted. When $\rho = 0$, or when $\rho \ll 1$, elements of $\Sigma$ which are close to zero are preferably "truncated" to zero, to prevent very high values from appearing in the matrix Y and impeding its stability. In such a case, the following method, which is similar to truncated SVD inversion, is preferably used to solve equation (1). Preferably, $$Y = V\overline{\Sigma} U^H, \overline{\Sigma} = \begin{pmatrix} \overline{D} & 0 \\ 0 & 0 \end{pmatrix},$$

where the elements of $\overline{D}$ are of the form $$\frac{\sigma_i}{\sigma_i^2 + \rho}$$

for those elements of $\Sigma$ not truncated, and are zero for the truncated elements of $\Sigma$.

Thus, the addition of ρI where ρ is substantially different from zero adds stability to Y. The added stability also eliminates the need for the truncation operation in the SVD. It is noted that equation (2) takes the form $y_i = V\Sigma^H(\Sigma\Sigma^H + \rho I)^{-1} U_i^H$, in which $U_i^H$ is the i'th column of $U^H$. Since only column $y_i$ is needed, using equation (2) instead of equation (1) reduces the time complexity of the calculations, as described above with reference to FIGS. 2 and 3A–E. It is further noted that the equation $Y = (A^H A + \rho I)^{-1} A^H$, which may be used alternatively in step 104, becomes $Y = V(\Sigma^H \Sigma + \rho I)^{-1} \Sigma^H U^H$ which is similarly easily calculated.

Figure 8:
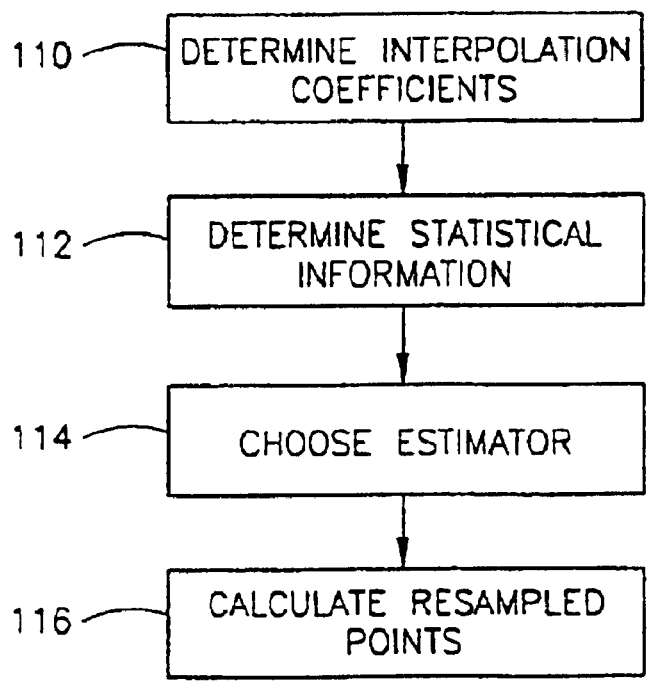
FIG. 8 is a flowchart of a method of resampling of data using estimation theory, in accordance with a preferred embodiment of the invention.

FIG. 8 is a flowchart of a resampling method more general than the method of FIG. 7, in accordance with a preferred embodiment of the invention. As in the method of FIG. 7, interpolation coefficients for converting between the uniform and non-uniform points are preferably determined (110). In addition, statistical information relating to the sampled data is preferably determined (112), as described hereinbelow. Preferably, the statistical information comprises second order moments, i.e., a covariance matrix $C_N$, of the noise component of the sampled signals. Alternatively or additionally, the statistical information comprises the first order moment $\mu_x$ and the second order moments $C_x$ of the expected resampled data x.

Statistical information regarding the noise component, such as covariance matrix $C_N$, is preferably determined using any of the methods described above with reference to step 102 of FIG. 7. Alternatively or additionally, the statistical information pertaining to the noise component is determined according to the sampling rate of the sampled data, preferably by comparing the sampling rate to the Nyquist rate, as is known in the art and described, for example, in Example 3.13 of the above mentioned book "Fundamentals of Statistical Processing: Estimation Theory". Further alternatively or additionally, the statistical information pertaining to the noise component is calculated based on attributes of the acquisition system.

The statistical information regarding the sampled data and/or the resampled data, e.g., $\mu_x$ and $C_x$, is preferably estimated from previously sampled data. Preferably, the statistical information from a plurality of prior sets of sampled data are used to create a representative set of statistical information. Preferably, the representative set of statistical information is an average of the statistical information from the plurality of acquisition sessions. The representative set is preferably prepared during a calibration process of acquisition systems.

In some preferred embodiments of the present invention, a plurality of representative sets of statistical information are generated according to one or more attributes of the sampled data. The one or more attributes may include, for example, the identity of an organ being imaged or the age group of the patient being imaged. In a resampling session, a suitable representative set of statistical information is selected based on the one or more attributes of the acquisition session.

Alternatively or additionally, the statistical information is estimated from the sampled data, using methods known in the art. For example, a narrow LPF is applied to the sampled data to obtain an estimate of the expectation values for the resampled data. Further alternatively or additionally, an additional acquisition session, which preferably includes less sampled points than usual acquisition sessions, is performed. The data from the additional acquisition session is used to determine the statistical information.

Alternatively or additionally, the statistical information is guessed or otherwise determined based on a-priori information on the expected behavior of the resampled data.

Thereafter, an estimator is chosen (114), for example, the optimal linear Bayesian mean square error (MSE) estimator of resampled points x, which is illustrated in the following equation:

$$x = \mu_x + (A^H C_N^{-1} A + C_x^{-1})^{-1} A^H C_N^{-1} (b - A\mu_x) \qquad (3)$$

This estimator is described, for example, on page 328 of the above mentioned book, "Fundamentals of Statistical Processing: Estimation Theory".

The resampled data points x are then calculated (116) based on the estimator, using the determined statistical information from step (112) and the interpolation coefficients from step (110).

In some preferred embodiments of the present invention, one or more of the statistical parameters of equation (3), i.e., $\mu_x$, $C_N$ and $C_x$, are set arbitrarily to receive desired results. Thus, the statistical parameters may supply a tradeoff between noise and bias in a manner similar to that supplied by ρ in equation (1). In a preferred embodiment of the present invention, equation (3) takes the form $x = \mu_x + (A^H C_N^{-1} A + \rho C_x^{-1})^{-1} A^H C_N^{-1} (b - A\mu_x)$, in which ρ is a parameter adjustable by the user.

In some preferred embodiments of the present invention, one or more assumptions are made on the statistical information required for equation (3) in order to simplify the acquisition of the statistical information and/or to reduce required processing time. In a preferred embodiment of the present invention, some or all of the elements of $\mu_x$ are assumed to be zero, meaning that the resampled data is unbiased. Preferably, the noise component is assumed to be uncorrelated so that $C_N$ is diagonal. Further preferably, the noise component is assumed to be stationary so that $C_N = \sigma_N^2 I$. Alternatively or additionally, similar assumptions are made on the resampled data, although such assumptions are inaccurate. Such assumptions are preferably made when the effect of such assumptions on the resampled result is relatively small, and/or when the required statistical information is not easily obtained.

Using the assumptions that $\mu_x = 0$, $C_N = \sigma_N^2 I$ and $C_x = \sigma_x^2 I$ equation (3) converges into $x = (A^H A + \sigma_x^{-2} \sigma_N^2 I)^{-1} A^H b$. By using $\rho = \sigma_x^{-2} \sigma_N^2$ the method of FIG. 8 converges into the method of FIG. 7. It is noted that all the above remarks about solving equation (1) may be applied to equation (3) including the use of truncated SVD or other pseudo inversion methods, and the solving of equation (3) in blocks.

As mentioned above, equation (3) represents the optimal linear Bayesian MSE estimator of resampled points x. However, many other estimators, both Bayesian and conventional, may be used in step 114, in accordance with the invention. Preferably, a Bayesian estimator is used only when reliable statistical information of the expected resampled data is available. In a preferred embodiment of the present invention, a linear estimator is used. Alternatively or additionally, a non-linear estimator is used. Non-linear estimation is especially useful when there are non-linearities in the relationship between the sampled data and the resampled points, for example, when the RF amplifier of an acquisition system is saturated. The MSE Bayesian estimator shown in the following equation:

$$x = E(x|b) \qquad (4)$$

is an example of a non-linear estimator. The estimator of equation (4) is described on page 316 of the above referenced book, "Fundamentals of Statistical Processing: Estimation Theory". This estimator takes the mean of the posterior probability density function (PDF), i.e., the conditional mean of the resampled points given the sampled values of the sampled points.

Preferably, the statistical information acquired in step 112 is compatible with the estimator used. For example, some estimators require the entire PDF of the noise component. Preferably, the PDF is normalized and/or centralized before the resampling. It is noted, however, that in some cases some of the required statistical information may be set arbitrarily or determined only approximately.

In a preferred embodiment of the invention, a conventional linear estimator as illustrated in the following equation (described for example on page 97 of the above referenced book):

$$x = (A^H C_N^{-1} A)^{-1} A^H C_N^{-1} b \quad (5)$$

is used in step 114. In this embodiment, preferably only statistical information regarding the noise component of the sampled signals is determined in step 112.

Other suitable estimators that may be used in step 114 include, for example, the Best Linear Unbiased estimator, the Maximum Likelihood Estimator, the Least Squares estimator (LSE), and the method of moments estimator, all of which are described in chapter 14 of the above mentioned book titled "Fundamentals of Statistical Processing: Estimation Theory".

In some preferred embodiments of the present invention, any of the above estimators is used to estimate a function of the sampled data at the resampled points rather than the actual values of the data at the resampled points. The function comprises, for example, a windowed convolution which smoothes the sampled data. The window used in the convolution preferably comprises a KB window, a triangle window or any other suitable window.

In some preferred embodiments of the present invention, the estimator is chosen based on an optimality criterion of a weighted form of the sampled data. Such weights are used, for example, when the sampled points have different levels of reliability. Preferably, areas with less reliability, such as areas in which there is more noise, are given less weight. In some preferred embodiments of the present invention, sampled points in areas which contain a higher density of points are given more weight. Alternatively or additionally, points in higher density areas are given lower weights. In some preferred embodiments of the present invention, the weights given to the plurality of points are determined based on experimental data of the acquisition system.

A preferred embodiment of the present invention uses the weighted LSE estimator described on page 225 of the above referenced book, i.e., $Y = (AWA^H)^{-1} AW$ (W is a weight matrix). It is noted, however, that weights may be added to other estimators and to other equations described herein.

The following discussion shows another derivation of equation (1), which highlights other possible changes to the methods of FIGS. 7 and 8 that are in the scope of the present invention.

A physical value, for example, a magnetic field value is sampled in M non-uniform data points $\kappa_1, \ldots \kappa_m$. The sampled values received at these points are represented by $\tilde{b}_1 = f(\kappa_1), \ldots, \tilde{b}_m = f(\kappa_m)$. Each of the sampled values $\tilde{b}_i$ is a sum of a signal component $b_i$ and a noise component $v_i$, ($\tilde{b}_i = b_i + v_i$). It is desired to calculate the values of the magnetic field at N uniform points $k_1, \ldots, k_N$, in which the values are $x_1 = f(k_1), \ldots, x_N = f(k_N)$.

A random variable $S_i$ which represents the signal value at a point $k_i$ is preferably defined. Preferably, $S_i = x_i$. An estimation variable $\hat{S}_i$ estimates $S_i$ using a suitable estimator, for example, the Bayesian MSE estimator shown in equation (4). Using linear estimation, $$\hat{S}_i = \sum_{j=1}^{K} y_{ij} \tilde{b}_j$$

which is a linear combination of the values $\tilde{b}_i$ of a sub-group of $K \leq M$ non-uniform points. Preferably, the K non-uniform points are located in the vicinity of $x_i$ as described hereinabove. Coefficients $y_{ij}$ of the linear combination are preferably determined so as to minimize an estimation error between $S_i$ and $\hat{S}_i$. Preferably, the estimation error minimized is the mean square estimation error: $E\{(S_i - \hat{S}_i)^2\}$, although any other suitable estimation error definition may be used, such as $E\{|S_i - \hat{S}_i|\}$ or a weighted squares estimation error $E\{(S_i - \hat{S}_i)^T W (S_i - \hat{S}_i)\}$. Preferably as in linear estimation, $S_i$ and $\hat{S}_i$ fulfill the orthogonality principle (see the above referenced book by Papoulis): $E\{(S_i - \hat{S}_i)\tilde{b}_k\} = 0$ for $k = 1, \ldots, K$. From substitution of the above definitions in the principle of orthogonality we obtain:

$$E\left\{\left(x_i - \sum_{m=1}^{K} y_{im}(b_m + v_m)\right)(b_k + v_k)\right\} = 0 \text{ for } k = 1, \ldots, K \quad (6)$$

Preferably, it is assumed that the noise components and the signal components of the sampled signals are uncorrelated:

Assumption (I): $E\{b_m v_m\} = E\{b_m\} E\{v_m\}$

Further preferably, it is assumed that the mean of the noise components is zero:

Assumption (II): $E\{v_m\} = 0$

Using assumptions (I) and (II), equation (6) becomes:

$$\sum_{m=1}^{K} y_{im} [E(b_m b_k) + E(v_m v_k)] = E(x_i b_k) \text{ for } k = 1, \ldots, K$$

Preferably, it is further assumed that the noise components of the sampled signals are uncorrelated with each other:

Assumption (III): $E\{v_k v_m\} = \sigma_N^2 \delta_{mk}$

It is noted, however, that assumption (III) is true only if the sampling is performed at the Nyquist frequency and the noise in the receiver is white noise.

It is also preferably assumed that the resampled uniform signals are stationary:

Assumption (IV): $E\{f(k)f(k')\} = R(k-k')$ and uncorrelated:

Assumption (V): $E\{x_k x_m\} = \sigma_x^2 \delta_{mk}$

These assumptions are also generally inaccurate and are used in order to simplify equation (7). It is noted, however, that the results obtained using assumptions (III), (IV) and (V) are substantially equivalent to the results obtained above in the absence of statistical knowledge on the signal. Thus, assumptions (III), (IV) and (V) are used herein as equivalents of assuming that no statistical information regarding the resampled signals is available.

Using assumptions (III) and (IV), equation (7) becomes:

$$\sum_{m=1}^{K} y_{im}[R(k(b_m)-k(b_k))+\sigma_N^2 \delta_{mk}] = R(k(x_i)-k(b_k)) \text{ for } k=1,\ldots,K \quad (8)$$

Using the coefficients of matrix A, i.e., $$b_j = \sum_{i=1}^{N} a_{ji} x_i$$

for j=1, . . . ,M, the auto-correlation of the non-uniform signals is:

$$E\{b_k b_m\} = E\left[\sum_{i=1}^{N} a_{ki} x_i \sum_{n=1}^{N} a_{mn} x_n\right]$$
$$= \sum_{i=1}^{N}\sum_{n=1}^{N} a_{mn} a_{ki} E[x_i x_n]$$
$$= \sigma_x^2 \sum_{n=1}^{N} a_{mn} a_{kn}$$

and the cross-correlation of the uniform and the non-uniform signals is:

$$E\{x_i b_k\} = E\left[x_i \sum_{n=1}^{N} a_{kn} x_n\right] = \sum_{n=1}^{N} a_{kn} E[x_i x_n] = a_{ki} \sigma_x^2$$

Thus, equation (7) becomes:

$$\sum_{m=1}^{K} y_{im}\left[\sum_{n=1}^{K} a_{mn} a_{kn} + \frac{\sigma_N^2}{\sigma_x^2} \delta_{mk}\right] = a_{ki}$$

which is another form of equation (1).

In some preferred embodiments of the present invention, the elements of matrix Y are determined using any of equations (6), (7) and (8) or any other similar equation along the path of the above derivation. In a preferred embodiment of the present invention, the elements of matrix Y are calculated from equation (7). In this embodiment, the determined statistical information (112) includes the second order statistics of the signal and noise components of the sampled data. Given this statistical information, equation (7) describes K linear equations with K unknowns.

Preferably, the statistical information of the noise component is determined using any of the methods described above. Preferably, the statistical information of the signal component of the sampled data is determined directly from the sampled data. Alternatively or additionally, the statistical information of the signal component is determined based on prior sampled data in a manner similar to any of the above mentioned methods of acquiring statistical information regarding the resampled data.

It is noted that the above equation derivation may be altered in numerous points to produce other estimators. For example, alterations may be made in the definition of the random variable being estimated (e.g., the random variable may be a filtered function of the sampled data), in the type of estimator used, in the assumptions applied, and in the interpolation coefficients used.

Although in the embodiments of FIGS. 7 and 8 coefficient matrix A is determined, matrix A is not necessarily required.

In some preferred embodiments of the present invention, the estimator is represented as a function of other interpolation coefficients. For example, the estimator may be formulated as a function of forward coefficients for interpolating data from the non-uniform to the uniform points. Alternatively or additionally, no interpolation coefficients are used in determining the estimator, for example, when the estimator is based on equation (6), above. In these embodiments the PDF and/or the moments supply information otherwise received from matrix A.

In a preferred embodiment of the present invention, resampling is performed by an MRI imager. Preferably, the statistical information, especially data regarding the noise component, is determined during a calibration stage for each imager produced. Alternatively or additionally, the statistical information is determined for an entire production line of imagers. Further alternatively or additionally, statistical information is determined for images of different areas of the human body. Before an imaging or a reconstruction session a physician notifies the imager which area is being imaged, and accordingly the statistical information is retrieved from an internal memory.

In some preferred embodiments of the present invention, at least some of the statistical information is determined separately for each imaging session. Preferably, the statistical information is determined directly from the sampled data. Alternatively or additionally, statistical information of the noise component is estimated based on the sampling rate, relative to the Nyquist rate. Further alternatively or additionally, while a patient is within the MRI imager either before, during or after an imaging session, signals are sampled without any signals induced in the patient in order to determine the statistical information of the noise component.

In some preferred embodiments of the present invention, the one or more attributes associated with the sampled data, the statistical information and/or an arbitrary parameter are used to adjust a filter in a filtering stage performed before or after a resampling process. For example, the statistical information is used to determine the amount of smoothness to be supplied by the filter in each resampled point after the resampling, before the resampled data is used to create an image.

The above described methods are not limited to application on real matrices, such as interpolation matrices. For example, the steps of resampling and FT could be combined, in which case the combined matrix describing the connection between the sampled points and the resampled points is generally a complex matrix. In such a case, b=AFx where b is the sampled data, x is the image data, A is an interpolation matrix, and F is a two dimensional FT matrix. Defining Q=AF we receive a complex matrix Q which may replace matrix A in any of the above methods and equations. In such a case, the image (or a function thereof) is directly obtained and the FT step is not required. Furthermore, the above described methods are not limited to use in discrete cases and the principles of the present invention may be applied to continuous variables, preferably using integrals.

It is noted that although the terms "non-uniform" and "uniform" data points were used widely in the above description, the resampling methods of the present application are not limited to resampling from non-uniform to uniform data points. Rather, resampling in accordance with preferred embodiments of the invention may be performed between any two sets of points. For example, resampling may be used to rotate, translate or otherwise distort a sampled image. Furthermore, resampling may be used to warp the k-space to correct for non-uniformities in applied gradients and/or other applied magnetic fields (B0, B1, etc.). In some preferred embodiments of the present invention, a single estimator resamples non-uniform sampled data to uniform points and rotates the image. In some preferred embodiments of the present invention, uniform or non-uniform data is resampled onto a radial spatial distribution suitable for back projection.

In a preferred embodiment of the invention, the above described techniques of interpolation and estimation may also be used for temporal smoothing, estimating and/or predicting. One example of such a use is in real-time imaging of a moving structure, where a previous value of a data point may be used to help estimate a currently sampled value.

It is further noted that the methods of the present invention may be used to perform combined methods which include resampling and other tasks such as combined resampling and FT, or combined resampling and spectroscopic analysis.

Although some of the methods of the present invention were described using examples pertaining to CT imaging and other methods were described using examples pertaining to MRI, it will be understood that the above embodiments pertain to CT, MRI and also other medical imaging methods, such as ultrasound. Furthermore, the resampling methods of the present invention may be used in applications other than medical applications, such as in industrial imaging. These resampling methods may also be used in applications other than imaging applications, such as in spectroscopy. In addition, the sampled data does not necessarily need to be sampled using the same apparatus as performs the resampling and/or immediately after resampling. For example, dedicated resampling apparatus may receive data from an external source.

Figure 9A:
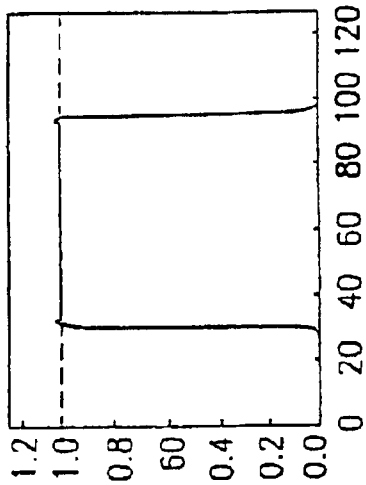
Figure 9B:
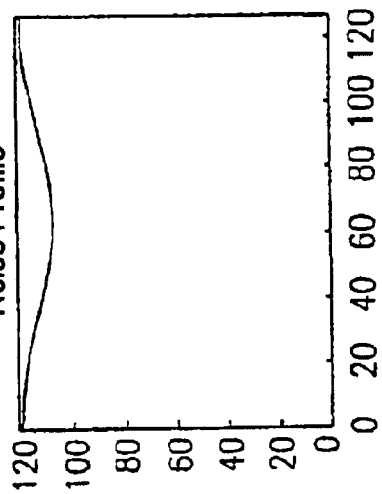
Figure 9C:
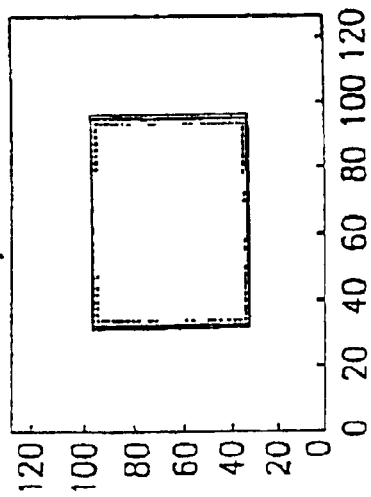
Figure 9D:
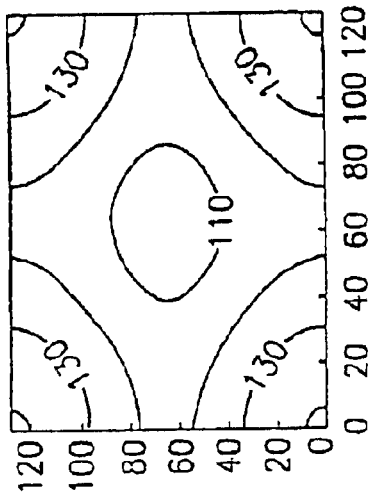

FIGS. 9A–13D illustrate results of reconstructing an image by resampling using equation (1) with different values of $\rho$, in accordance with a preferred embodiment of the present invention. FIGS. 14A–14D illustrate comparative prior art reconstruction results from the Jackson gridding method. All the resampling results are synthetic simulation results for data sampled along a four interleaf-spiral. The results were received for an input sampled image with a unit height square synthetic phantom covering half the field of view. All the numbers marked in the figures and used in the following explanation are in arbitrary units common to all the figures. FIGS. 9A, 10A, etc., show two dimensional reconstructed images of the respective reconstruction methods, without noise. FIGS. 9B, 10B, etc., show one dimensional horizontal profiles from along the center of the respective reconstructed images of FIGS. 9A, 10A, etc. FIGS. 9C, 10C, etc., show two dimensional images of the standard deviation of the noise in the real (or imaginary) part of the images resulting after two dimensional FT from the respective methods, when pure noise is sampled. The input noise comprises samples of uncorrelated, white, Gaussian noise with a unit standard deviation. FIGS. 9D, 10D, etc., show one dimensional horizontal profiles from the center of the respective reconstructed images of FIGS. 9C, 10C, etc.

Figure 10B:
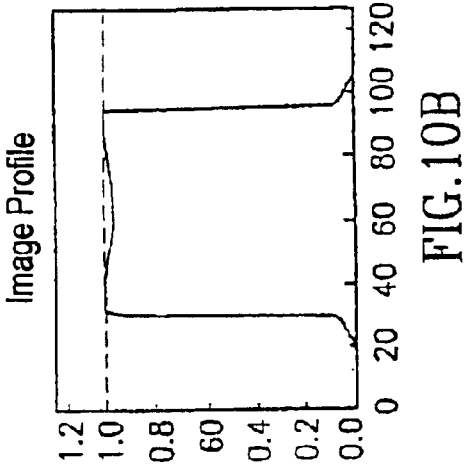
Figure 10D:
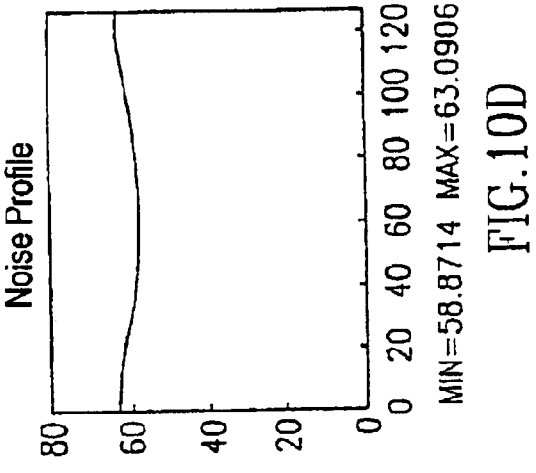
Figure 10A:
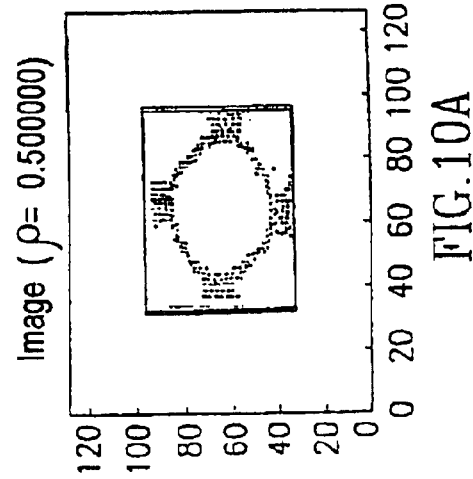
Figure 10C:
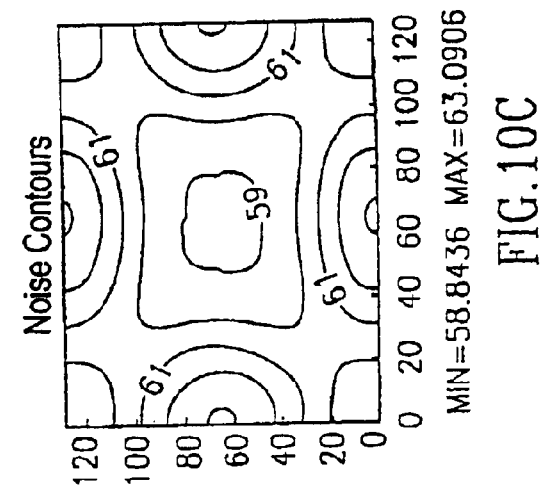
Figure 13B:
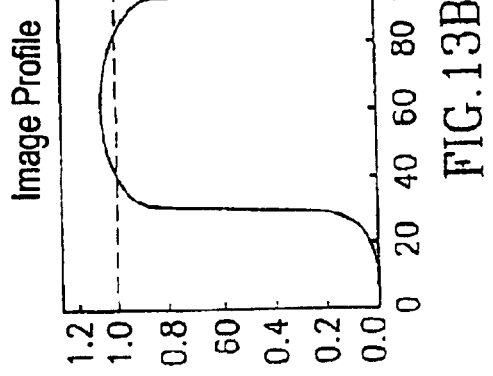
Figure 13D:
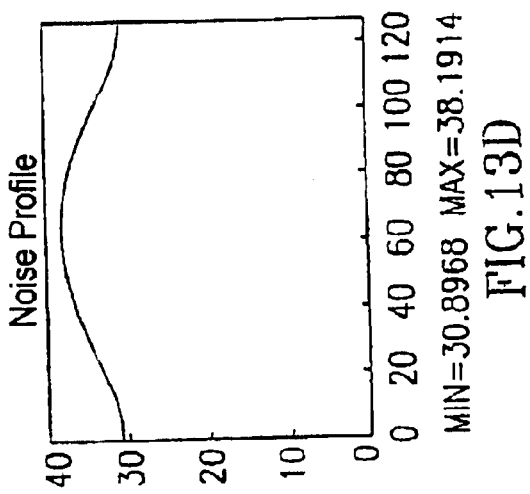
Figure 13A:
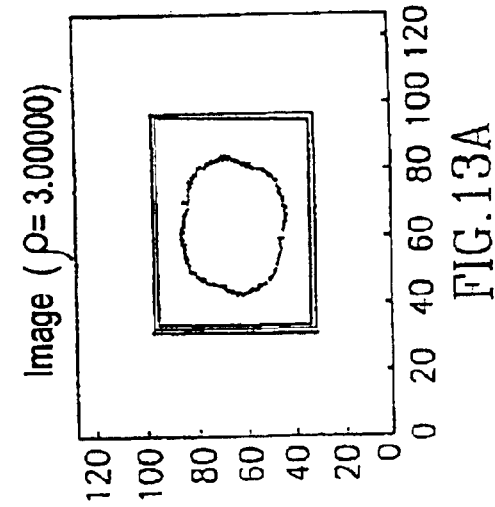
Figure 13C:
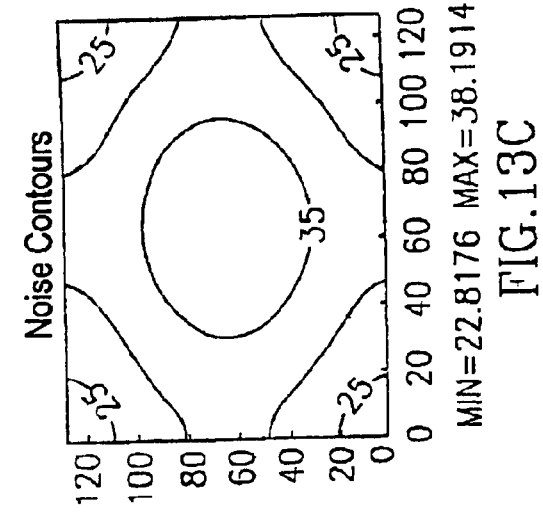

FIGS. 9A–9D illustrate the effect of the method of equation (1) with $\rho=0$. The reconstructed bias is relatively small, as the reconstructed image is nearly entirely at unit height except for the edges of the central square (Gibbs artifact). The noise level, on the other hand is relatively high and ranges between 105 and 119. With $\rho=0.5$ a certain level of bias is added to the reconstructed image, as can be seen in FIGS. 10A and 10B. However, the noise level is reduced to about 60 and ranges between 58.8 and 63.1. Thus, the reconstructed image is a little less accurate than for $\rho=0$ but is much clearer due to the lower level of noise. FIGS. 11A–11D, 12A–12D and 13A–13D illustrate the results of reconstruction for $\rho=1.0$, $\rho=2.0$ and $\rho=3.0$, respectively. As can be seen from FIGS. 11C–11D, 12C–12D, and 13C–13D, the noise level decreases with the increase in $\rho$. On the other hand, with the increase in $\rho$ the bias increases as seen, for example, at the lower edges of the central square where the curve clearly increases with $\rho$. In a preferred embodiment of the present invention, a physician can select the $\sigma$ used in reconstruction according to a desired tradeoff between the noise and the bias.

Figure 14B:
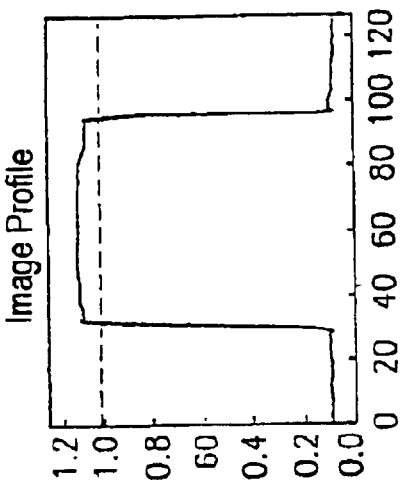
FIGS. 14A–14D illustrate results of comparative prior art reconstruction results.
Figure 14D:
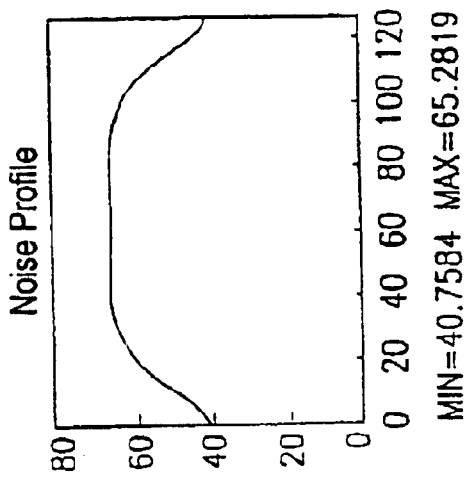
Figure 14A:
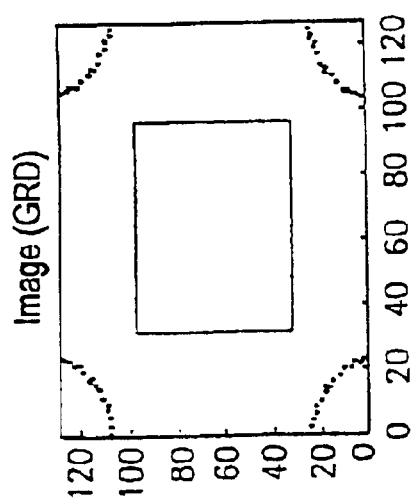
Figure 14C:
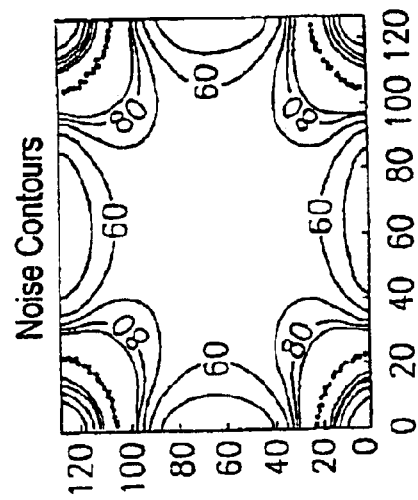

FIGS. 14A and 14B show the reconstructed image for a comparative prior art gridding method. In FIG. 14A the curls at the edges of the reconstructed image are evident. In addition, substantially the entire profile image contains a bias of about 0.1. The noise accompanying the reconstructed image is very high at the edges, as evident from FIG. 14C, and does not go below about 60 in the center of the image. The reconstructed images of the present invention using $\rho=0.5$ and $\rho=1.0$ have less bias and less noise than the reconstruction image of the prior art. Increasing $\rho$ reduces the noise level on account of increasing the bias and vice-versa: decreasing $\rho$ reduces the bias on account of increasing the noise level.

It should be appreciated that medical imaging, and to some extent non-medical imaging, has some unique attributes which affect the usage of the above described methods. Medical imaging requires imaging static and moving structures, preferably in real time. In addition, medical images contain a very large number of data points, in some cases over 1 million per image. This large number of data points must be acquired, in some cases, within a limited time period. Another unique attribute is noise. In medical imaging it is nearly always desirable to reduce the signal intensity used (e.g., radiation dosage, RF field amplitude), since most signals can somehow damage the human body. Reducing the signal usually requires dealing with lowers signal to noise levels. Another unique attribute is the types of non-uniformity encountered. In some types of medical imaging, the non-uniformities are mostly predictable, for example sinusoidal shaped gradients in EPI imaging. Also, the same imaging sequence may be repeated many times, with substantially the same non-uniformities occurring each time. Another attribute is the low tolerance for certain types of artifacts. A medical image is used to diagnose and/or rule out diseases and certain types of artifacts will greatly reduce the ability to perform such diagnosis.

It will be appreciated that the above described methods may be varied in many ways, including, changing the order of steps, which steps are performed on-line or off-line and the exact implementation used, which can include matrix arithmetic or which may perform the same arithmetic using other methods. In particular, sparse matrices may be multiplied using dedicated computer program modules and/or certain of the steps may be performed in parallel. It should also be appreciated that although the preferred embodiments were described only as methods, apparatus for carrying out the methods are within the scope of the invention, and various combinations of hardware and software may be used to carry out the invention.

It is noted that the above described embodiments are given by way of example only, and the scope of the invention is limited only by the claims. When used in the following claims, the terms "comprises", "comprising", "includes", "including" or the like mean "including but not limited to".

What is claimed is:

1. A method of resampling medical imaging data from a first spatial distribution of data points onto a second distribution of data points, comprising:

determining a matrix of reverse interpolation coefficients for resampling data from said second spatial distribution onto said first spatial distribution, the first spatial distribution and the second spatial distribution being in a first domain and the reverse interpolation coefficients being in the same domain as the first and second spatial distributions;

inverting, in the first domain, a matrix based on said reverse interpolation matrix to determine forward resampling coefficients for resampling data from said first spatial distribution to said second spatial distribution;

resampling, in the first domain, data from said first spatial distribution onto said second spatial distribution using said forward resampling coefficients; and transforming the resampled data into a second domain after the inverting and resampling.

2. A method according to claim 1, wherein inverting the matrix based on said reverse interpolation matrix comprises inverting the reverse interpolation matrix.

3. A method according to claim 1, wherein the matrix based on the reverse interpolation matrix comprises the sum of the reverse interpolation matrix multiplied by its Hermitian conjugate and a parameter matrix.

4. A method according to claim 3, wherein the parameter matrix comprises a diagonal matrix.

5. A method according to claim 3 wherein all the non-zero elements of the parameter matrix are substantially equal.

6. A method according to claim 3, wherein the parameter matrix comprises a correlation matrix.

7. A method according to claim 1, wherein the resampling coefficients comprise interpolation coefficients.

8. A method according to claim 1, wherein the resampling coefficients comprise estimation coefficients.

9. A method according to claim 1, wherein determining the reverse interpolation matrix comprises determining a real matrix.

10. A method according to claim 1, wherein said second spatial distribution comprises a uniform spatial distribution.

11. A method according to claim 10, wherein said first spatial distribution comprises a non-uniform spatial distribution.

12. A method according to claim 10, wherein said second spatial distribution comprises a radial spatial distribution.

13. A method according to claim 10, wherein said second spatial distribution comprises a Cartesian spatial distribution.

14. A method according to claim 1, wherein said medical imaging data comprises Magnetic Resonance k-space data.

15. A method according to claim 14, wherein said medical imaging data comprises Magnetic Resonance Imaging data.

16. A method according to claim 14, wherein said medical imaging data comprises Magnetic Resonance spectroscopy data.

17. A method according to claim 1, wherein said medical imaging data comprises CT k-space data.

18. A method according to claim 1, wherein said medical imaging data comprises CT projection data, converted from fan-beam to parallel beam.

19. A method according to claim 1, wherein said medical imaging data comprises diffraction tomography k-space data.

20. A method of claim 1, wherein inverting comprises calculating a pseudo-inverse matrix.

21. A method according to claim 20, wherein inverting comprises inverting using rank truncated SVD (Singular Value Decomposition).

22. A method according to claim 1, wherein said determining is performed locally on said first and second spatial distributions.

23. A method according to claim 22, wherein said inverting is performed locally on said first and second spatial distributions.

24. A method according to claim 23, wherein determining a matrix of resampling coefficients comprises selecting M points from said second spatial distribution and N points from said first spatial distribution, for each of said localities.

25. A method according to claim 24, wherein said $\overline{M}$ points are selected from a first region surrounding a point $x_i$.

26. A method according to claim 25, wherein $\overline{M}$ is dependent on the locality.

27. A method according to claim 25, wherein said first region is circular, having a first radius dependent on the locality.

28. A method according to claim 25, wherein said first region is non-circular.

29. A method according to claim 28, wherein said first region is rectangular.

30. A method according to claim 24, wherein said $\overline{N}$ points are selected from a second region surrounding a point $x_i$.

31. A method according to claim 30, wherein $\overline{N}$ is dependent on the locality.

32. A method according to claim 30, wherein said second region is circular, having a second radius dependent on the locality.

33. A method according to claim 30, wherein said second region is non-circular.

34. A method according to claim 33, wherein said second region is rectangular.

35. A method according to claim 23, wherein said resampling comprises generating an inversion matrix wherein each row is created from an inversion at a locality.

36. A method according to claim 35, comprising copying resampling coefficients resulting from said inversion into a zeroed matrix row of said inversion matrix, which row corresponds to point $x_i$.

37. A method according to claim 23, wherein said determining is performed using a grid different from said second spatial distribution.

38. A method according to claim 37, wherein said different grid has a greater extent than said second spatial distribution.

39. A method according to claim 37, wherein said different grid has a different spacing than said second spatial distribution.

40. A method according to claim 39, wherein said different grid has a larger spacing than said second spatial distribution.

41. A method according to claim 39, wherein said different grid has a smaller spacing than said second spatial distribution.

42. A method according to claim 23, wherein said resampling comprises pre-multiplying a matrix comprising said forward interpolation coefficients, by a filter.

43. A method according to claim 42, wherein said filter has a FIR (Finite Impulse Response) and wherein said FIR is smaller than an extent of said locality.

44. A method according to claim 42, wherein said filter has an impulse response having most of its energy concentrated within an area smaller than an extent of said locality.

45. A method according to claim 1, wherein said resampling comprises resampling spatial data having dimensionality greater than one.

46. A method according to claim 1, wherein the step of transforming includes reconstructing an image from said resampled data by applying an FFT (Fast Fourier Transform) to said data.

47. An MRI apparatus comprising;

a magnetic resonance imaging system (MRI); and a computer system for use with the MRI apparatus comprising a computer programmed to:
- determine a non-uniform spatial distribution of imaging k-space data points and a uniform spatial distribution of imaging k-space data points;
- determine a matrix of reverse interpolation coefficients for resampling data from the uniform spatial distribution onto the non-uniform spatial distribution, the reverse interpolation coefficients being in a same domain as that of the imaging k-space data;
- invert, in the same domain as the imaging k-space data, a matrix based on the reverse interpolation matrix to determine forward resampling coefficients for resampling data from the non-uniform spatial distribution to the uniform spatial distribution;
- resample, in the same domain as the imaging k-space data, data from the non-uniform spatial distribution onto the uniform spatial distribution using the forward resampling coefficients; and
- apply a Fourier Transform to the resampled data after the inverting and resampling.

48. The MRI apparatus of claim 47 wherein the computer is further programmed to determine a pseudo-inverse matrix to invert the matrix.

49. The MRI apparatus of claim 48 wherein the computer is further programmed to use truncated Singular Value Decomposition to invert the matrix.

50. The MRI apparatus of claim 47 wherein the computer is further programmed to determine the matrix of reverse interpolation coefficients locally on the uniform spatial distribution and the non-uniform spatial distribution.

51. The MRI apparatus of claim 50 wherein the inversion is performed locally on the uniform spatial distribution and the non-uniform spatial distribution.

52. The MRI apparatus claim 51 wherein the computer is further programmed to determine the matrix of resampling coefficients by selecting M points from the uniform spatial distribution and N points for the non-uniform spatial distribution.

53. The MRI apparatus of claim 50 wherein the computer is further programmed to generate an inversion matrix wherein each row is created from an inversion at a locality to resample data from the non-uniform spatial distribution onto the uniform spatial distribution.

54. The MRI apparatus of claim 47 wherein the Fourier Transform includes Fast Fourier Transform.

* * * * *